(12) United States Patent
Duerk et al.

(10) Patent No.: US 10,374,968 B1
(45) Date of Patent: Aug. 6, 2019

(54) DATA-DRIVEN AUTOMATION MECHANISM FOR ANALYTICS WORKLOAD DISTRIBUTION

(71) Applicant: EMC IP Holding Company LLC, Hopkinton, MA (US)

(72) Inventors: Bryan Duerk, Shrewsbury, MA (US); Natalie Corridan-Gregg, Shrewsbury, MA (US); Patricia Gomes Soares Florissi, Briarcliff Manor, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 319 days.

(21) Appl. No.: 15/395,340

(22) Filed: Dec. 30, 2016

(51) Int. Cl.
*H04L 12/911* (2013.01)
*G06F 9/50* (2006.01)
*H04L 29/08* (2006.01)
*H04L 12/24* (2006.01)

(52) U.S. Cl.
CPC ............ *H04L 47/70* (2013.01); *G06F 9/5027* (2013.01); *H04L 41/0893* (2013.01); *H04L 67/10* (2013.01)

(58) Field of Classification Search
CPC ..... H04L 47/70; H04L 41/0893; H04L 67/10; G06F 9/5027
USPC ........................................................ 709/226
See application file for complete search history.

(56) References Cited

U.S. PATENT DOCUMENTS

| | | | |
|---|---|---|---|
| 6,112,225 A * | 8/2000 | Kraft | G06F 9/5072 709/201 |
| 6,516,350 B1 | 2/2003 | Lumelsky et al. | |
| 7,657,537 B1 | 2/2010 | Corbett | |
| 7,934,018 B1 | 4/2011 | Lavallee et al. | |
| 7,934,248 B1 | 4/2011 | Yehuda et al. | |
| 8,224,825 B2 | 7/2012 | Wang et al. | |
| 8,499,331 B1 | 7/2013 | Yehuda et al. | |
| 8,732,118 B1 | 5/2014 | Cole et al. | |
| 8,806,061 B1 | 8/2014 | Lobo et al. | |
| 8,938,416 B1 | 1/2015 | Cole et al. | |

(Continued)

OTHER PUBLICATIONS

Wikipedia, "Apache Spark," https://en.wikipedia.org/wiki/Apache_Spark, Apr. 10, 2017, 6 pages.

(Continued)

*Primary Examiner* — Zi Ye
(74) *Attorney, Agent, or Firm* — Ryan, Mason & Lewis, LLP

(57) ABSTRACT

An apparatus in one embodiment comprises at least one processing device having a processor coupled to a memory. The processing device implements a first workload distribution node configured to communicate with multiple distributed data processing clusters over at least one network. The workload distribution node is further configured to receive a data processing request, to identify particular ones of the distributed data processing clusters that are suitable for handling at least a portion of the data processing request, and to assign the data tasks to one or more of the distributed data processing clusters. Results of performance of the data tasks from the one or more assigned distributed data processing clusters are received by the first workload distribution node and aggregated into a response that is returned to a source of the data processing request. The source of the data processing request in some embodiments is another workload distribution node.

20 Claims, 8 Drawing Sheets

(56) References Cited

U.S. PATENT DOCUMENTS

| | | | |
|---|---|---|---|
| 9,020,802 B1 | 4/2015 | Florissi et al. |
| 9,031,992 B1 | 5/2015 | Florissi et al. |
| 9,130,832 B1 | 9/2015 | Boe et al. |
| 9,158,843 B1 | 10/2015 | Florissi et al. |
| 9,229,952 B1 | 1/2016 | Meacham et al. |
| 9,235,446 B2 | 1/2016 | Bruno et al. |
| 9,280,381 B1 | 3/2016 | Florissi et al. |
| 9,338,218 B1 | 5/2016 | Florissi et al. |
| 9,361,263 B1 | 6/2016 | Florissi et al. |
| 9,418,085 B1 | 8/2016 | Shih et al. |
| 9,489,233 B1 | 11/2016 | Florissi et al. |
| 9,678,497 B2 | 6/2017 | Karypis et al. |
| 9,747,127 B1 | 8/2017 | Florissi et al. |
| 9,747,128 B1 | 8/2017 | Vijendra et al. |
| 9,767,149 B2 | 9/2017 | Ozcan et al. |
| 9,838,410 B2 | 12/2017 | Muddu et al. |
| 9,996,662 B1 | 6/2018 | Florissi et al. |
| 10,015,106 B1 | 7/2018 | Florissi et al. |
| 10,111,492 B2 | 10/2018 | Florissi et al. |
| 10,122,806 B1 | 11/2018 | Florissi et al. |
| 10,127,352 B1 | 11/2018 | Florissi et al. |
| 10,270,707 B1 | 4/2019 | Florissi et al. |
| 10,277,668 B1 | 4/2019 | Florissi |
| 2002/0073167 A1 | 6/2002 | Powell et al. |
| 2005/0010712 A1 | 1/2005 | Kim et al. |
| 2005/0102354 A1 | 5/2005 | Hollenbeck et al. |
| 2005/0114476 A1 | 5/2005 | Chen et al. |
| 2005/0132297 A1 | 6/2005 | Milic-Frayling et al. |
| 2005/0153686 A1 | 7/2005 | Kall et al. |
| 2005/0266420 A1 | 12/2005 | Pusztai et al. |
| 2006/0002383 A1 | 1/2006 | Jeong et al. |
| 2006/0122927 A1 | 6/2006 | Huberman et al. |
| 2006/0126865 A1 | 6/2006 | Blamey et al. |
| 2007/0026426 A1 | 2/2007 | Fuernkranz et al. |
| 2007/0076703 A1 | 4/2007 | Yoneda et al. |
| 2007/0088703 A1 | 4/2007 | Kasiolas et al. |
| 2008/0027954 A1 | 1/2008 | Gan et al. |
| 2008/0028086 A1 | 1/2008 | Chetuparambil et al. |
| 2008/0077607 A1 | 3/2008 | Gatawood et al. |
| 2008/0155100 A1* | 6/2008 | Ahmed ................. G06F 9/5011 709/226 |
| 2008/0279167 A1 | 11/2008 | Cardei et al. |
| 2009/0062623 A1 | 3/2009 | Cohen et al. |
| 2009/0076651 A1 | 3/2009 | Rao |
| 2009/0150084 A1 | 6/2009 | Colwell et al. |
| 2009/0198389 A1 | 8/2009 | Kirchhof-Falter et al. |
| 2009/0310485 A1 | 12/2009 | Averi et al. |
| 2009/0319188 A1 | 12/2009 | Otto |
| 2010/0042809 A1 | 2/2010 | Schenfeld et al. |
| 2010/0076845 A1 | 3/2010 | Mullins |
| 2010/0076856 A1 | 3/2010 | Mullins |
| 2010/0122065 A1 | 5/2010 | Dean et al. |
| 2010/0131639 A1 | 5/2010 | Narayana et al. |
| 2010/0184093 A1 | 7/2010 | Donovan et al. |
| 2010/0229178 A1 | 9/2010 | Ito |
| 2010/0290468 A1 | 11/2010 | Lynam et al. |
| 2010/0293334 A1 | 11/2010 | Xun et al. |
| 2010/0299437 A1 | 11/2010 | Moore |
| 2011/0020785 A1 | 1/2011 | Lowery, Jr. et al. |
| 2011/0029999 A1 | 2/2011 | Foti |
| 2011/0103364 A1 | 5/2011 | Li |
| 2011/0145828 A1 | 6/2011 | Takahashi et al. |
| 2011/0314002 A1 | 12/2011 | Oliver et al. |
| 2012/0030599 A1 | 2/2012 | Butt et al. |
| 2013/0035956 A1 | 2/2013 | Carmeli et al. |
| 2013/0044925 A1 | 2/2013 | Kozuka et al. |
| 2013/0194928 A1 | 8/2013 | Iqbal |
| 2013/0246460 A1 | 9/2013 | Maltbie et al. |
| 2013/0282897 A1 | 10/2013 | Siegel et al. |
| 2013/0290249 A1 | 10/2013 | Merriman et al. |
| 2013/0291118 A1* | 10/2013 | Li et al. ................. G06F 21/60 726/26 |
| 2013/0318257 A1 | 11/2013 | Lee et al. |
| 2013/0346229 A1 | 12/2013 | Martin et al. |
| 2013/0346988 A1 | 12/2013 | Bruno et al. |
| 2014/0012843 A1 | 1/2014 | Soon-Shiong |
| 2014/0025393 A1 | 1/2014 | Wang et al. |
| 2014/0075161 A1 | 3/2014 | Zhang et al. |
| 2014/0082178 A1 | 3/2014 | Boldyrev et al. |
| 2014/0173331 A1 | 6/2014 | Martin et al. |
| 2014/0173618 A1 | 6/2014 | Neuman et al. |
| 2014/0280298 A1 | 9/2014 | Petride et al. |
| 2014/0280363 A1 | 9/2014 | Heng et al. |
| 2014/0280604 A1 | 9/2014 | Ahiska et al. |
| 2014/0280990 A1 | 9/2014 | Dove et al. |
| 2014/0310718 A1 | 10/2014 | Gerphagnon et al. |
| 2014/0325041 A1 | 10/2014 | Xu et al. |
| 2014/0358999 A1 | 12/2014 | Rabinowitz et al. |
| 2014/0365518 A1 | 12/2014 | Calo et al. |
| 2014/0372611 A1 | 12/2014 | Matsuda et al. |
| 2014/0379722 A1* | 12/2014 | Mysur ................. G06F 16/183 707/740 |
| 2015/0006619 A1 | 1/2015 | Banadaki et al. |
| 2015/0019710 A1 | 1/2015 | Shaashua et al. |
| 2015/0039667 A1 | 2/2015 | Shah et al. |
| 2015/0066646 A1 | 3/2015 | Sriharsha et al. |
| 2015/0081877 A1* | 3/2015 | Sethi ................. H04L 67/1012 709/224 |
| 2015/0088786 A1 | 3/2015 | Anandhakrishnan |
| 2015/0120791 A1 | 4/2015 | Gummaraju et al. |
| 2015/0121371 A1 | 4/2015 | Gummaraju et al. |
| 2015/0169683 A1 | 6/2015 | Chandramouli et al. |
| 2015/0178052 A1 | 6/2015 | Gupta et al. |
| 2015/0254558 A1 | 9/2015 | Arnold et al. |
| 2015/0269230 A1 | 9/2015 | Kardes et al. |
| 2015/0277791 A1 | 10/2015 | Li et al. |
| 2015/0295781 A1 | 10/2015 | Maes |
| 2015/0302075 A1 | 10/2015 | Schechter et al. |
| 2015/0339210 A1 | 11/2015 | Kopp et al. |
| 2015/0369618 A1 | 12/2015 | Barnard et al. |
| 2016/0004827 A1 | 1/2016 | Silva et al. |
| 2016/0063191 A1 | 3/2016 | Vesto et al. |
| 2016/0072726 A1 | 3/2016 | Soni et al. |
| 2016/0087909 A1* | 3/2016 | Chatterjee ............... H04L 47/70 709/226 |
| 2016/0098021 A1 | 4/2016 | Zornio et al. |
| 2016/0098472 A1 | 4/2016 | Appleton |
| 2016/0098662 A1* | 4/2016 | Voss ................. G06Q 10/06316 705/7.26 |
| 2016/0112531 A1 | 4/2016 | Milton et al. |
| 2016/0132576 A1 | 5/2016 | Qi et al. |
| 2016/0170882 A1 | 6/2016 | Choi et al. |
| 2016/0179642 A1 | 6/2016 | Cai |
| 2016/0179979 A1 | 6/2016 | Aasman et al. |
| 2016/0182305 A1 | 6/2016 | Martin et al. |
| 2016/0182327 A1 | 6/2016 | Coleman, Jr. et al. |
| 2016/0188594 A1 | 6/2016 | Ranganathan |
| 2016/0205106 A1 | 7/2016 | Yacoub et al. |
| 2016/0241893 A1 | 8/2016 | Allhands et al. |
| 2016/0260023 A1 | 9/2016 | Miserendino, Jr. et al. |
| 2016/0267132 A1 | 9/2016 | Castellanos et al. |
| 2016/0269228 A1 | 9/2016 | Franke et al. |
| 2016/0337473 A1 | 11/2016 | Rao |
| 2017/0006135 A1 | 1/2017 | Siebel et al. |
| 2017/0032263 A1 | 2/2017 | Yuan et al. |
| 2017/0083573 A1 | 3/2017 | Rogers et al. |
| 2017/0116289 A1 | 4/2017 | Deshmukh et al. |
| 2017/0187785 A1 | 6/2017 | Johnson et al. |
| 2017/0220646 A1 | 8/2017 | Schechter et al. |
| 2017/0272458 A1 | 9/2017 | Muddu et al. |
| 2017/0323028 A1 | 11/2017 | Jonker et al. |
| 2018/0054355 A1 | 2/2018 | Balser et al. |
| 2018/0101583 A1 | 4/2018 | Li et al. |
| 2018/0189296 A1 | 7/2018 | Ashour et al. |
| 2018/0308585 A1 | 10/2018 | Holmes et al. |

OTHER PUBLICATIONS

U.S. Appl. No. 15/485,843 filed in the name of Patricia Gomes Soares Florissi et al., Apr. 12, 2017 and entitled "Scalable Distributed In-Memory Computation."

(56) References Cited

OTHER PUBLICATIONS

U.S. Appl. No. 15/582,743 filed in the name of Patricia Gomes Soares Florissi et al., Apr. 30, 2017 and entitled "Scalable Distributed In-Memory Computation Utilizing Batch Mode Extensions."
M.K. Gardner et al., "Parallel Genomic Sequence-Searching on an Ad-Hoc Grid: Experiences, Lessons Learned, and Implications," Proceedings of the 2006 ACM/IEEE SC/06 Conference, IEEE Computer Society, 2006, 14 pages.
A.G. Craig et al., "Ordering of Cosmid Clones Covering the Herpes Simplex Virus Type I (HSV-I) Genome: A Test Case for Fingerprinting by Hybridisation," Nucleic Acids Research, vol. 18, 1990, pp. 2653-2660.
T.R. Golub et al., "Molecular classification of Cancer: Class Discovery and Class Prediction by Gene Expression Monitoring," Science, vol. 286, Oct. 15, 1999, pp. 531-537.
D. Singh et al., "Gene Expression Correlates of Clinical Prostate Cancer Behavior," Cancer Cell, vol. 1, Mar. 2002, pp. 203-209.
U.S. Appl. No. 15/281,248 filed in the name of Patricia Gomes Soares Florissi et al., Sep. 30, 2016 and entitled "Methods and Apparatus Implementing Data Model for Disease Monitoring, Characterization and Investigation."
P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.
J.Y.L. Lee et al., "Sufficiency Revisited: Rethinking Statistical Algorithms in the Big Data Era," The American Statistician, Dec. 15, 2016, 22 pages.
S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.
K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.
V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.
A.C. Murthy et al., "Apache Hadoop YARN: Moving beyond MapReduce and Batch Processing with Apache Hadoop 2," Addison-Wesley Professional, Mar. 29, 2014, 78 pages.
Global Alliance for Genomics and Health, "Beacons," https://genomicsandhealth.org/work-products-demonstration-projects/beacons, Jun. 27, 2014, 2 pages.
Data Working Group, "Global Alliance Genomics API," http://ga4gh.org/#/documentation, Dec. 28, 2015, 2 pages.
Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.
U.S. Appl. No. 14/982,341 filed in the name of Patricia Gomes Soares Florissi et al. Dec. 29, 2015 and entitled "Multi-Cluster Distributed Data Processing Platform."
U.S. Appl. No. 14/982,351 filed in the name of Patricia Gomes Soares Florissi et al. Dec. 29, 2015 and entitled "Distributed Catalog Service for Multi-Cluster Data Processing Platform."
X. Wu et al., "Privacy Preserving Data Mining Research: Current Status and Key Issues," Proceedings of the 7th International Conference on Computational Science, Part III: ICCS 2007, May 2007, pp. 762-772.
A.P. Kulkarni et al., "Survey on Hadoop and Introduction to YARN," International Journal of Emerging Technology and Advanced Engineering, May 2014, pp. 82-87, vol. 4, No. 5.
Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.
R.R. Miller et al., "Metagenomics for Pathogen Detection in Public Health," Genome Medicine, Sep. 20, 2013, 14 pages, vol. 5, No. 81.
T. Thomas et al., "Metagenomics—A Guide from Sampling to Data Analysis," Microbial Informatics and Experimentation, Oct. 13, 2012, 12 pages, vol. 2, No. 3.
E.R. Ganser et al., "A Technique for Drawing Directed Graphs," IEEE Transactions on Software Engineering, Mar. 1993, pp. 214-230, vol. 19, No. 3.
J. Leskovec, "Graphs Over Time: Densification Laws, Shrinking Diameters and Possible Explanations," Proceedings of the Eleventh ACM SIGKDD International Conference on Knowledge Discovery in Data Mining, Aug. 21-24, 2005, pp. 177-187.
H. Zha et al., "Bipartite Graph Partitioning and Data Clustering," Proceedings of the Tenth International Conference on Information and Knowledge Management, Oct. 5-10, 2001, pp. 25-32.
A. Oghabian et al., "Biclustering Methods: Biological Relevance arid Application in Gene Expression Analysis," PLOS ONE, Mar. 20, 2014, 10 pages, vol. 9, No. 3.
S. Ryza, "How to: Tune Your Apache Spark Jobs," https://blog.cloudera.com/blog/2015/03/how-to-tune-your-apache-spark-jobs-part-1/, Mar. 9, 2015, 23 pages.
T. White, "Hadoop: The Definitive Guide," O'Reilly Media, Inc., Fourth Edition, Sebastopol, CA, Apr. 2015, 756 pages.
L. Shashank, "Spark on Yarn," https://www.slideshare.net/datamantra/spark-on-yarn-54201193, Oct. 21, 2015, 47 pages.

\* cited by examiner

US 10,374,968 B1

DATA-DRIVEN AUTOMATION MECHANISM FOR ANALYTICS WORKLOAD DISTRIBUTION

RELATED APPLICATIONS

The present application is related to U.S. patent application Ser. No. 14/982,341, filed Dec. 29, 2015, now U.S. Pat. No. 10,015,106, and entitled "Multi-Cluster Distributed Data Processing Platform," which is incorporated by reference herein in its entirety, and which claims priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and incorporated by reference herein in their entirety.

FIELD

The field relates generally to information processing systems, and more particularly to information processing systems that implement distributed processing across a plurality of processing nodes.

BACKGROUND

The need to extract knowledge from data collected on a global scale continues to grow. In many cases the data may be dispersed across multiple geographic locations, owned by different entities, and in different formats. Although numerous distributed data processing frameworks exist today, these frameworks have significant drawbacks. For example, data-intensive computing tasks often use data processing frameworks such as MapReduce or Spark. However, these frameworks typically require deployment of a distributed file system shared by all of the processing nodes, and are therefore limited to data that is accessible via the shared distributed file system. Such a shared distributed file system can be difficult to configure and maintain over multiple local sites that are geographically dispersed and possibly also subject to the above-noted differences in ownership and data format. In the absence of a shared distributed file system, conventional arrangements may require that data collected from sources in different geographic locations be copied from their respective local sites to a single centralized site configured to perform data analytics. Such an arrangement is not only slow and inefficient, but it can also raise serious privacy concerns regarding the copied data.

SUMMARY

Illustrative embodiments of the present invention provide information processing systems that are configured to distribute analytics workloads and other types of workloads over multiple distributed data processing node clusters.

In one embodiment, and apparatus comprises at least one processing device having a processor coupled to a memory. The processing device implements a first workload distribution node configured to communicate with a plurality of distributed data processing clusters over at least one network. The workload distribution node is further configured to receive a data processing request, to identify particular ones of the plurality of distributed data processing clusters that are suitable for handling at least a portion of the data processing request, to separate the data processing request into a plurality of data tasks, to provide each of the data tasks to one or more of the identified distributed data processing clusters, to receive for each of the data tasks an indication from one or more of the distributed data processing clusters of its ability to perform the data task, and to assign the data tasks to one or more of the distributed data processing clusters responsive to the received indications. Results of performance of the data tasks from the one or more assigned distributed data processing clusters are received by the first workload distribution node and aggregated into a response that is returned to a source of the data processing request. The source of the data processing request in some embodiments is another workload distribution node.

These and other illustrative embodiments include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
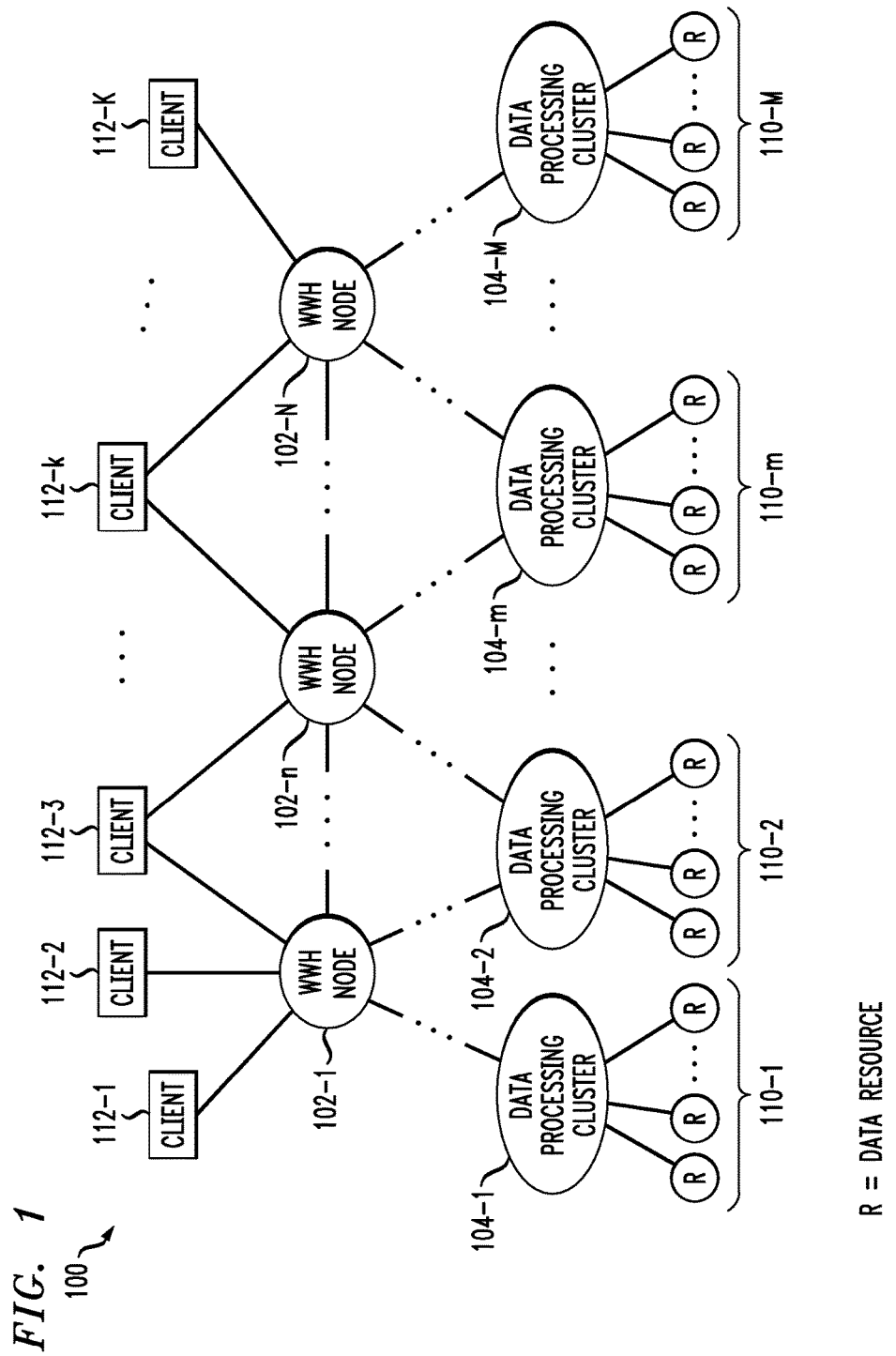
FIG. 1 is a block diagram of an information processing system comprising a multi-cluster distributed data processing platform in an illustrative embodiment of the invention.

FIG. 1 shows an information processing system 100 comprising a multi-cluster distributed data processing platform in an illustrative embodiment. The system 100 comprises a plurality of processing nodes 102, individually denoted as 102-1, . . . 102-n, . . . 102-N, each of which communicates with one or more distributed data processing clusters 104, individually denoted as 104-1, 104-2, . . . 104-m, . . . 104-M.

In some implementations of the FIG. 1 embodiment, one or more of the distributed data processing clusters 104 comprise respective Apache Hadoop YARN ("Yet Another Resource Negotiator") clusters. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein. Numerous alternative types of distributed data processing clusters may be used in place of or in addition to Apache Hadoop YARN clusters.

The processing nodes 102 are configured to communicate with one another and with their associated distributed data processing clusters 104 over one or more networks that are not explicitly shown in the figure.

The processing nodes 102 are illustratively implemented as respective worldwide data nodes, and more particularly as respective worldwide Hadoop (WWH) nodes, although numerous alternative processing node types can be used in other embodiments. The WWH nodes are assumed to be configured to perform operations in accordance with any framework supported by Hadoop YARN clusters or other types of clusters comprising respective ones of the distributed data processing clusters 104. Examples of frameworks supported by Hadoop YARN clusters include MapReduce, Spark, Hive, MPI and numerous others.

The acronym WWH as used herein is additionally or alternatively intended to refer to a "worldwide herd" arrangement where the term "herd" in this context illustratively connotes multiple geographically-distributed Hadoop platforms. More generally, WWH is used to denote a worldwide data processing platform potentially comprising multiple clusters.

In the FIG. 1 embodiment, the multi-cluster distributed data processing platform more particularly comprises a WWH platform having one or more layers of WWH nodes 102 and a plurality of potentially geographically-distributed data processing clusters 104. Each of the distributed data processing clusters 104 illustratively comprises a corresponding cluster of distributed data processing nodes. The WWH platform is illustratively configured for worldwide scale, geographically-dispersed computations and other types of cluster-based processing based on locally-accessible data resources, as will be described in more detail elsewhere herein.

It is to be appreciated that a wide variety of other types of processing nodes 102 can be used in other embodiments. Accordingly, the use of WWH nodes in the FIG. 1 embodiment and other embodiments disclosed herein is by way of illustrative example only, and should not be construed as limiting in any way.

It should also be noted that one or more of the WWH nodes 102 in some embodiments can be part of a corresponding one of the distributed data processing clusters 104. For example, in some embodiments of a WWH platform as disclosed herein, the distributed data processing clusters 104 themselves each comprise one or more layers of WWH nodes. Accordingly, these and other embodiments need not include a separate layer of WWH nodes 102 above the distributed data processing clusters 104. The WWH nodes 102 may be viewed as examples of what are more generally referred to herein as distributed data processing nodes. The distributed data processing clusters 104 are each also assumed to comprise a plurality of additional or alternative distributed data processing nodes.

Each distributed data processing cluster 104 illustratively includes a resource manager for that cluster. For example, in some embodiments YARN can be used to provide a cluster-wide operating system that allows applications to utilize the dynamic and parallel resource infrastructure a computer cluster offers. However, conventional YARN implementations are generally configured to operate in single-cluster environments, and do not provide any support for managing distributed applications which span across more than one cluster.

The WWH platform in the FIG. 1 embodiment is an example of what is more generally referred to herein as a "multi-cluster distributed data processing platform." This WWH platform and other WWH platforms disclosed herein advantageously extends YARN to multi-cluster environments. For example, the WWH platform in some embodiments is configured to orchestrate the execution of distributed WWH applications on a worldwide scale, across multiple, potentially geographically-distributed YARN clusters. The WWH platform therefore provides a platform for running distributed applications across multiple data zones each having a corresponding YARN cluster.

Other types of multi-cluster distributed data processing platforms may be implemented in other embodiments. Accordingly, references herein to a WWH platform, YARN clusters and associated features are intended as illustrative examples only, and should not be construed as limiting in any way. For example, other embodiments can be implemented without using WWH nodes or YARN clusters. Accordingly, it should be understood that the distributed data processing techniques disclosed herein are more generally applicable to a wide variety of other types of multi-cluster platforms.

Each of the distributed data processing clusters 104 in the system 100 is associated with a corresponding set of local data resources 110, individually denoted as local data resource sets 110-1, 110-2, . . . 110-m, . . . 110-M. The local data resource sets each provide one or more local data resources to the corresponding cluster for analytics processing. Results of the processing performed within a given cluster utilizing one or more locally available data resources accessible to that cluster are illustratively provided to one or more other ones of the clusters or to an associated one of the WWH nodes 102 for additional processing associated with provision of analytics functionality within the system 100.

The data resources of each of the sets 110 of data resources are individually identified using the letter R in FIG. 1. Although these data resources are illustratively shown as being external to the distributed data processing clusters 104, this is by way of example only and it is assumed in some embodiments that at least a subset of the data resources of a given set 110 are within the corresponding distributed data processing cluster 104. Accordingly, a given cluster can perform processing operations using a combination of internal and external local data resources.

The results of the analytics processing performed by a given one of the distributed data processing clusters 104 illustratively comprise results of local analytics processing using frameworks such as MapReduce, Spark and numerous others.

It should be understood that the above-noted analytics results are merely examples of what are more generally referred to herein as "processing results" of a given cluster. Such results can take different forms in different embodiments, as will be readily appreciated by those skilled in the art. For example, such processing results can comprise local analytics results that have been processed in a variety of different ways within a cluster before being provided to one of more of the WWH nodes 102 for additional processing. Numerous other types of processing results can be used in other embodiments.

The WWH nodes 102 are each coupled to one or more clients 112. By way of example, the set of clients 112 may include one or more desktop computers, laptop computers, tablet computers, mobile telephones or other types of communication devices or other processing devices in any combination. The clients are individually denoted in the figure as clients 112-1, 112-2, 112-3, . . . 112-k, . . . 112-K. The clients 112 may comprise, for example, respective end users or associated hardware entities, software entities or other equipment entities. For example, a "client" as the term is broadly used herein can comprise a software-implemented entity running on a user device or other processing device within the system 100.

The variables N, M and K denote arbitrary values, as embodiments of the invention can be configured using any desired number of WWH nodes 102, distributed data processing clusters 104 and clients 112. For example, some embodiments may include multiple distributed data processing clusters 104 and multiple clients 112 but only a single WWH node 102, or multiple WWH nodes 102 corresponding to respective ones of the distributed data processing clusters 104. Numerous alternative arrangements are possible, including embodiments in which a single system element combines functionality of at least a portion of a WWH node and functionality of at least a portion of a distributed data processing cluster. Thus, alternative embodiments in which the functions of a WWH node and a distributed data processing cluster are at least partially combined into a common processing entity are possible.

The WWH nodes 102 in some embodiments are implemented at least in part as respective analysis nodes. The analysis nodes may comprise respective computers in a cluster of computers associated with a supercomputer or other high performance computing (HPC) system. The term "processing node" as used herein is intended to be broadly construed, and such nodes in some embodiments may comprise respective compute nodes in addition to or in place of providing analysis node functionality.

The system 100 may include additional nodes that are not explicitly shown in the figure. For example, the system 100 may comprise one or more name nodes. Such name nodes may comprise respective name nodes of a Hadoop Distributed File System (HDFS), although other types of name nodes can be used in other embodiments. Particular objects or other stored data of a storage platform can be made accessible to one or more of the WWH nodes 102 via a corresponding name node. For example, such name nodes can be utilized to allow the WWH nodes 102 to address multiple HDFS namespaces within the system 100.

Each of the WWH nodes 102 and distributed data processing clusters 104 is assumed to comprise one or more databases for storing analytics processing results and possibly additional or alternative types of data.

Databases associated with the WWH nodes 102 or the distributed data processing clusters 104 and possibly other elements of the system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage arrays such as VNX® and Symmetrix VMAX® storage arrays, both commercially available from Dell EMC of Hopkinton, Mass. Other types of storage products that can be used in implementing a given storage platform in an illustrative embodiment include software-defined storage products such as ScaleIO™ and ViPR®, server-based flash storage devices such as DSSD™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

Additionally or alternatively, a given storage platform can implement multiple storage tiers. For example, a storage platform can comprise a 2 TIERS™ storage system, also from Dell EMC.

These and other storage platforms can be part of what is more generally referred to herein as a processing platform comprising one or more processing devices each comprising a processor coupled to a memory.

A given processing device may be implemented at least in part utilizing one or more virtual machines or other types of virtualization infrastructure such as Docker containers or other types of Linux containers (LXCs). The WWH nodes 102 and distributed data processing clusters 104, as well as other system components, may be implemented at least in part using processing devices of such processing platforms.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that the particular arrangement of system elements shown in FIG. 1 is for purposes of illustration only, and that other arrangements of additional or alternative elements can be used in other embodiments. For example, numerous alternative system configurations can be used to implement multi-cluster distributed data processing functionality as disclosed herein. Accordingly, the particular arrangements of layers, nodes and clusters shown in the FIG. 1 embodiment and other embodiments herein are presented by way of example only, and should not be construed as limiting in any way.

Additional details regarding example processing functionality that may be incorporated in at least a subset of the WWH nodes in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

The WWH platform in the FIG. 1 embodiment and one or more other embodiments disclosed herein illustratively adheres to local processing within each cluster using data locally accessible to that cluster. This is achieved without the need for implementing a distributed file system over the multiple clusters. Also, movement of data resources between clusters is avoided. Instead, data resources are processed locally within their respective clusters.

This orchestration of distributed applications over multiple clusters is facilitated in illustrative embodiments through the use of what is referred to herein as a WWH catalog. The WWH catalog is a catalog of data resources, and is an example of what is more generally referred to herein as a "distributed catalog service."

In some embodiments, each cluster that is part of the WWH platform has access to or otherwise comprises an instance of the WWH catalog implemented for that cluster. The WWH catalog instance implemented for a given cluster illustratively contains detailed information regarding local data resources of that cluster, such as, for example, file names and metadata about the files and their content, and references to one or more other clusters in the case of a non-local resource. This creates a hierarchical structure to execution of a WWH application within the WWH platform.

It should be noted that each cluster need not include its own instance of the WWH catalog. For example, in some embodiments, only a subset of the clusters of a multi-cluster distributed data processing platform implement respective instances of a distributed WWH catalog. In such an arrangement, clusters that do not include respective WWH catalog instances can nonetheless participate in performance of computations associated with a distributed WWH application.

A WWH application identifies data files and other input data items from among the various data resources characterized by the WWH catalog. A given such input data item can more particularly comprise, for example, a text file, an XML file, a result relation of a database query or a result of an API query.

Data resources characterized by the WWH catalog can be considered global in the sense that clients are oblivious to the particular location of the resource. For example, a given resource can be comprised of several other resources, each residing in a different data zone. A meta-resource is a piece of data that describes a corresponding data resource. It generally includes the location of the resource and information about how to access the resource.

The WWH catalog is distributed over the clusters of the WWH platform with each of the clusters having visibility of only its corresponding instance of the WWH catalog. In some embodiments, the distributed instances of the WWH catalog are implemented as respective YARN applications running on respective ones of the clusters of the WWH platform.

A given instance of the WWH catalog on a corresponding one of the clusters typically comprises a plurality of entries with each such entry comprising a meta-resource including information characterizing location and accessibility of a corresponding one of the data resources. By way of example, the meta-resource for a given local data resource may comprise a file path to a storage location of that local data resource in the corresponding cluster. Also by way of example, the meta-resource for a given remote data resource may comprise information identifying another cluster for which that data resource is a local data resource.

A given meta-resource of the WWH catalog may additionally or alternatively comprise one or more other types of information, such as, for example, information regarding transformation of the data resource into one or more designated formats, access control information, policy rules, etc.

The WWH catalog therefore illustratively provides a catalog of entries, each comprising a meta-resource. Each meta-resource describes the respective resource and may contain the code or an API required to transform the resource to the format required by the application. End users or other types of clients may browse the WWH catalog via a browsing API or other type of browsing interface in order to obtain information about meta-resources, and WWH applications may query it for information about how to access the data.

As noted above, the WWH catalog is assumed to be distributed across multiple data zones and their respective clusters. Such a distributed arrangement helps to provide security and privacy for the underlying data resources.

Although distributed implementations of the WWH catalog are advantageous in some embodiments, it is possible in other embodiments for the WWH catalog to be implemented in only a single cluster of a WWH platform. Other alternative implementations may include distributed implementations in which the WWH catalog is distributed over only a subset of the clusters of a WWH platform, rather than over all of the clusters of the WWH platform.

The WWH platform and its associated WWH catalog in illustrative embodiments implement a recursiveness property that allows a given distributed application initiated on one of the clusters to initiate additional applications on respective additional ones of the clusters. Those additional applications can similarly initiate more applications on other ones of the clusters different than the clusters on which the additional applications were initiated. In this manner, a distributed application can be executed utilizing local data resources of multiple clusters while preserving the privacy of each of the clusters in its local data resources.

In some embodiments, security measures are deployed that prevent the data zones from being accessible to the outside world. For example, firewalls, routers and gateways may prevent public access to a cluster of a given data zone, allowing access to the cluster only from within a certain access point. The WWH platform in illustrative embodiments is configured to allow such "hidden" data zones to take part in both sharing data and computation.

A WWH platform configured to run applications across multiple clusters associated with respective distinct data zones is advantageous in terms of both privacy and performance. Privacy is provided in that an application submitted to an initial cluster corresponding to a specific data zone accesses the data local to that data zone. The results of the application execution in the initial cluster may be transferred to other clusters corresponding to respective other data zones, but such processing results are typically aggregated and therefore need not include any private information. Furthermore, the recursiveness property mentioned above can in some embodiments be configured so as to hide even the knowledge of which of the clusters participate in the application execution. For similar reasons, performance is greatly improved. Usually raw data stays in its original location and only the results which are of much smaller size may be transferred between clusters. This contributes to improved performance both because of the inherent parallelism and the reduced data transfer between clusters.

As is apparent from the above, the overall privacy and efficiency of the WWH platform is maintained in some embodiments by adhering to local processing within clusters and their associated data zones. In order to keep the processing local, the WWH catalog includes meta-resources that direct the computation to the cluster where the data is stored, such that the computation moves and the data does not.

The WWH platform in illustrative embodiments provides significant advantages relative to conventional systems. For example, the WWH platform in some embodiments is oblivious to the particular local file systems utilized in the respective clusters. Moreover, the WWH platform keeps local raw data private within each of the clusters, does not need a centralized controller or scheduler, and is not limited to use with only the MapReduce framework but is more generally suitable for use with any of a wide variety of frameworks that are supported by YARN, as well as additional or alternative frameworks in non-YARN embodiments.

The WWH platform in some embodiments utilizes a distributed WWH catalog having instances accessible to respective ones of the clusters, and is thus agnostic to where exactly the data resides, and its exact format, and does not require a global file system.

The WWH platform in some embodiments is strongly privacy aware. It supports and encourages local processing of local data and provides simple ways for sending intermediate processing results which do not contain private information between clusters.

The WWH platform can provide similar advantages for other aspects of Governance, Risk and Compliance (GRC). For example, by pushing processing closer to where the data is located, the WWH platform facilitates enforcement of policies relating to governance, management of risk, and compliance with regulatory requirements, all at the local level.

The WWH platform supports multiple data zones. A data zone is illustratively a distinct data processing cluster with its own local data. Such a data zone may execute a YARN application such as a MapReduce application on its local data. The WWH platform provides a framework which spans across multiple data zones, and enables the combination of processing results based on local data resources of the respective data zones in a global manner. Thus, the WWH platform provides and encourages cooperation between different data zones. However, the WWH platform does not encourage moving raw data between data zones, for both performance and privacy reasons, as well as for other related reasons such as the above-noted facilitation of GRC at the local level.

The WWH platform in some embodiments has an open architecture in the sense that any data processing cluster can join the WWH platform, and therefore the WWH platform in such an embodiment does not require any single centralized controller. Every participating cluster is in control of the data it wishes to share with the outside world. An authorized external client can connect to any data zone supported by the WWH platform and there is no single entry point.

The WWH platform can be illustratively implemented utilizing YARN applications. For example, when a client wishes to run a WWH application it contacts a first one of the clusters, and runs a YARN application on that cluster. When other clusters need to be contacted, one or more containers of the first cluster act like respective clients for the other clusters, and run YARN applications on those other clusters. Thus in each individual cluster the distributed WWH application is seen as an individual YARN application and YARN itself is not aware of the multiple data zone aspects of the WWH application or the WWH platform.

Like YARN itself, the WWH platform in some embodiments is functionally separated into a platform layer and a framework layer. The WWH framework layer can be configured to support WWH frameworks for executing WWH applications that utilize any of a wide variety of underlying YARN frameworks. A developer can write WWH frameworks, and clients will be able to use those WWH frameworks, in a manner similar to how YARN frameworks such as MapReduce or Spark are utilized on single clusters. For example, some embodiments of WWH platforms described herein are provided with a WWH framework for running MapReduce applications in different data zones associated with respective multiple YARN clusters and using a global reducer in a particular YARN cluster to compute the final results. Alternatively, the global reducer can be implemented at least in part outside of the YARN clusters, such as within a given one of the WWH nodes.

As indicated above, however, WWH platforms are not limited to use with YARN clusters, and can more generally comprise other types of distributed data processing clusters in addition to or in place of YARN clusters.

Additional details regarding WWH platforms that can be used in the FIG. 1 embodiment and other embodiments of the present invention are disclosed in U.S. patent application Ser. No. 14/982,341, filed Dec. 29, 2015, now U.S. Pat. No. 10,015,106, and entitled "Multi-Cluster Distributed Data Processing Platform," and U.S. patent application Ser. No. 14/982,351, filed Dec. 29, 2015, now U.S. Pat. No. 10,270,707, and entitled "Distributed Catalog Service for Multi-Cluster Data Processing Platform," both commonly assigned herewith and incorporated by reference herein.

Illustrative embodiments disclosed in the above-cited patent applications provide information processing systems that are configured to execute distributed applications over multiple distributed data processing node clusters associated with respective distinct data zones. Each data zone in a given embodiment illustratively comprises a Hadoop YARN cluster or other type of cluster configured to support one or more distributed data processing frameworks, such as MapReduce and Spark. These and other similar arrangements can be advantageously configured to provide analytics functionality in a decentralized and privacy-preserving manner, so as to overcome the above-noted drawbacks of conventional systems. This is achieved in some embodiments by orchestrating execution of distributed applications across the multiple YARN clusters. Computations associated with data available locally within a given YARN cluster are performed within that cluster. Accordingly, instead of moving data from local sites to a centralized site, computations are performed within the local sites where the needed data is available. This provides significant advantages in terms of both performance and privacy. Additional advantages are provided in terms of security, governance, risk and compliance.

For example, some embodiments provide WWH platforms that are faster and more efficient than conventional analytics systems. Moreover, multi-cluster distributed data processing platforms in some embodiments are implemented in a decentralized and privacy-preserving manner. These and other multi-cluster distributed data processing platforms advantageously overcome disadvantages of conventional practice, which as indicated previously often rely on copying of local data to a centralized site for analysis, leading to privacy and performance concerns.

In some embodiments, a multi-cluster distributed data processing platform is configured to leverage Big Data profiles and associated Big Data analytics in processing local and remote data resources across multiple geographic regions or other types of data zones.

Additional details regarding Big Data profiles and associated Big Data analytics that can be implemented in illustrative embodiments of the present invention are described in U.S. Pat. No. 9,031,992, entitled "Analyzing Big Data," which is commonly assigned herewith and incorporated by reference herein.

A multi-cluster distributed data processing platform in an illustrative embodiment can utilize the data scattered across multiple regional data centers located worldwide, while preserving data privacy and adjusting for differences in data formats and other factors between the various data centers.

A WWH platform in some embodiments leverages one or more frameworks supported by Hadoop YARN, such as MapReduce, Spark, Hive, MPI and numerous others, to support distributed computations while also minimizing data movement, adhering to bandwidth constraints in terms of speed, capacity and cost, and satisfying security policies as well as policies relating to governance, risk management and compliance.

As is apparent from the foregoing, illustrative embodiments include information processing systems that are configured to distribute analytics workloads and other types of workloads over multiple distributed data processing node clusters. Such embodiments may comprise WWH platforms of the type described above.

Additional illustrative embodiments implementing data-driven automation mechanisms for analytics workload distribution in illustrative embodiments will now be described with reference to FIGS. 2 through 6.

In these embodiments, a WWH platform is configured to include automation mechanisms for analytics workload distribution that illustratively include a data broker framework referred to herein as WWH Data Auction (WWH-DA). As mentioned previously, Big Data analytics and other types of analytics workloads often utilize data from multiple disparate data sources that cannot be readily consolidated. The WWH platform is illustratively configured to allow a single analytic application to treat multiple, distributed compute clusters as a single, virtual compute cluster. The WWH platform in these and other embodiments handles the details of distributing the required computations to subsidiary, potentially geographically or otherwise separated clusters as required.

The WWH-DA data broker framework in some embodiments handles the details of formatting data processing requests across disparate data processing clusters of the WWH platform, including choosing the appropriate data processing clusters and managing the various data processing requirements and data governance involved when aggregating separate, dispersed data sets. Such arrangements advantageously provide general-purpose techniques for cataloging, securing and processing analytics jobs and other types of analytics workloads in a manner that ensures data governance policies are followed while also providing the optimal cluster(s) to handle the processing.

Additionally or alternatively, the WWH-DA data broker framework in some embodiments allows a set of federated schedulers to distribute work to subsidiary schedulers in a recursive fashion that is transparent to the originating user. For example, one or more embodiments illustratively provide a general-purpose data analysis scheduler that can handle a wide variety of different types of structured and unstructured data, including relational database tables, text documentation, pictures, video, device data, log files, genomic sequences, weather readings, social data feeds and many others.

A WWH data auction conducted via the WWH-DA data broker framework illustratively provides a workload distribution mechanism for allocating data processing requests to the data processing cluster resources best able to process the request.

Figure 2:
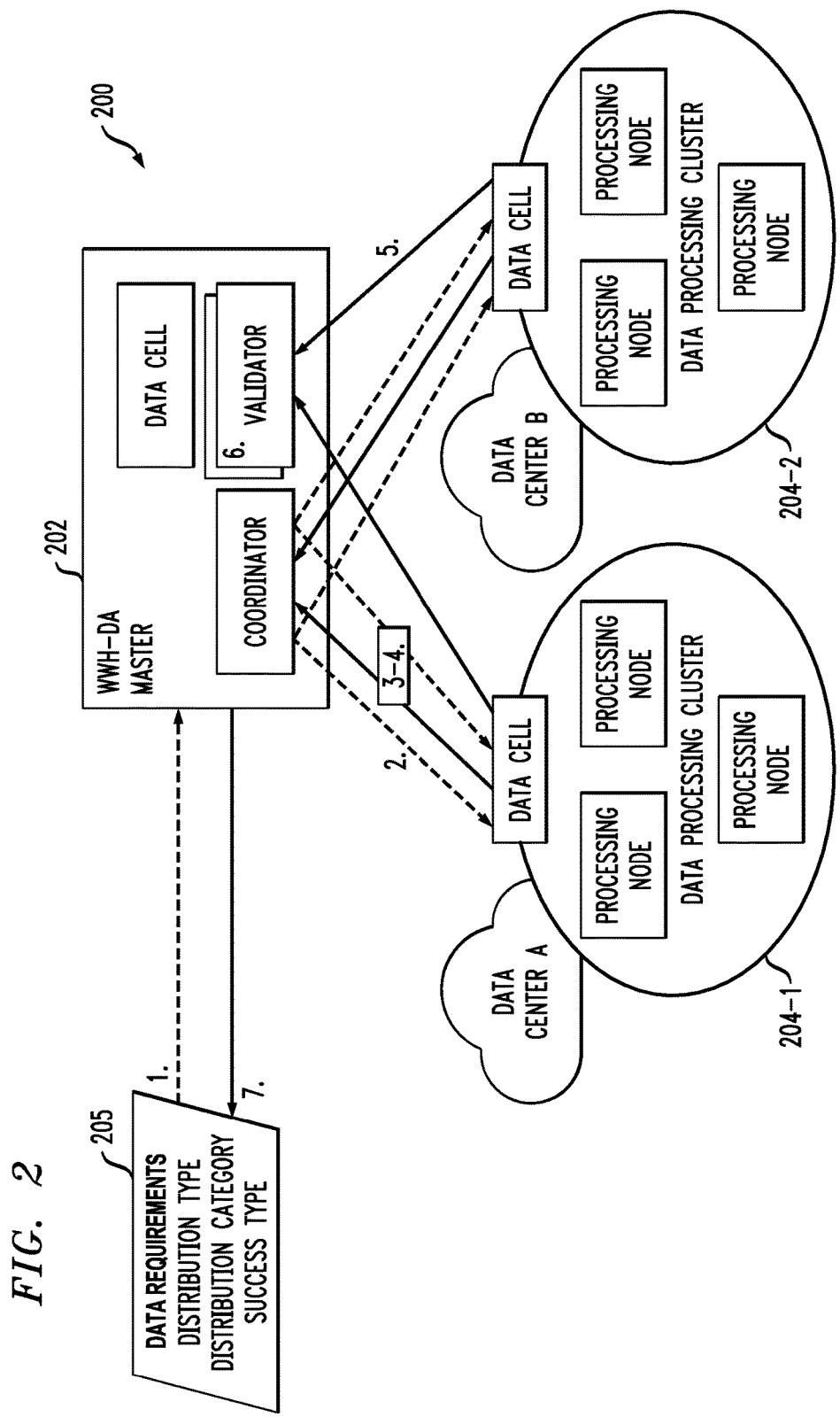
FIGS. 2 through 6 show examples of data-driven automation mechanisms for analytics workload distribution in illustrative embodiments.

Referring now to FIG. 2, an information processing system 200 comprises a multi-cluster distributed data processing platform in an illustrative embodiment. The system 200 comprises a workload distribution node 202 that communicates with distributed data processing clusters 204-1 and 204-2 as shown. The workload distribution node 202 is assumed to comprise at least a portion of a WWH node of the type described previously herein, and is an example of what is more generally referred to herein as a "processing node." The workload distribution node 202 in this embodiment more particularly comprises a portion of a WWH node referred to as a WWH-DA master. The WWH-DA master illustratively comprises a data cell, a coordinator and multiple validators.

The distributed data processing clusters 204-1 and 204-2 in this embodiment are associated with respective distinct data centers denoted Data Center A and Data Center B. The distributed data processing clusters 204 in some implementations of the FIG. 2 embodiment comprise respective YARN clusters, although it is to be appreciated that the FIG. 2 embodiment and other embodiments herein are not restricted to YARN clusters. Each of the distributed data processing clusters 204 illustratively includes a data cell. The data cell of the WWH-DA master illustratively communicates with the data cells of the distributed data processing clusters 204. For example, the data cell of the WWH-DA master can be configured to determine what types of data are available locally to the data cells of the respective distributed data processing clusters 204.

Although only a single workload distribution node 202 is shown in the figure for simplicity and clarity of illustration, the system 200 may comprise additional workload distribution nodes. The workload distribution nodes are configured to communicate with one another and with their associated distributed data processing clusters 204 over one or more networks that are not explicitly shown in the figure.

The workload distribution node 202 in the FIG. 2 embodiment receives a data processing request (DPR) 205 that specifies various data requirements of a given analytics workload or portion thereof. For example, the DPR 205 illustratively provides a specification that asks the system 200 to handle data on behalf of a requesting application. The DPR 205 in the present embodiment comprises a plurality of fields including a distribution type field, a distribution category field and a success type field. Additional or alternative fields can be included in a given DPR in other embodiments.

The distribution type field denotes a particular distribution type illustratively including one or more of the following:

1. Universal: All clusters containing the appropriate data are requested to participate in processing the DPR. Each cluster is considered separately in terms of the success of its participation in the processing the DPR.

2. Geographic: Only those clusters within a particular geographic area or areas are requested to participate in processing the DPR. This allows a user to place one or more geographic restrictions on the clusters that can participate in processing the DPR.

3. Custom: Only specified clusters are requested to participate in processing the DPR. This allows the user to place various types of non-geographic restrictions on the clusters that can participate in processing the DPR.

The distribution category field denotes a particular distribution category illustratively including a designated set of distributed data processing clusters of a particular distribution type. The distribution category can therefore specify the set of all clusters within a single distribution type. For example, if the WWH-DA master uses a geographic distribution type that divides the clusters by country, all the clusters in the USA would constitute a single distribution category. The success type field below determines which clusters within the distribution category will participate in processing data tasks of a DPR.

The success type field denotes a particular success type illustratively including one or more of the following:

1. Required: All clusters specified in the DPR distribution category are requested to participate in processing the DPR, and those clusters must all agree to participate before any cluster is scheduled.

2. At Least One: All clusters specified in the DPR distribution category are requested to participate in processing the DPR, and the first of those clusters that agrees to participate is scheduled. Additional clusters specified in the DPR distribution category are also scheduled if they later agree to participate.

3. First To Bid: All clusters specified in the DPR distribution category are requested to participate in processing the DPR, but only the first of those clusters that agrees to participate is scheduled while the remaining ones of those clusters are rejected.

4. Lowest Cost: All clusters specified in the DPR distribution category are requested to participate in processing the DPR, and the particular one of those clusters that returns the lowest cost is scheduled while the remaining ones of those clusters are rejected. Cost is an arbitrary metric that may relate to a real monetary cost, a processing cost, the inverse of the time to process the task, or other data-driven features or parameters.

5. Best Effort: All clusters specified in the DPR distribution category are requested to participate in processing the DPR. However, no cluster is required to participate in processing of the DPR for it to finish successfully. This success type is primarily used for recursive request completion.

The particular DPR fields and their respective types as described above are examples only, and other DPR configurations can be used in other embodiments. For example, some DPRs may be separable into multiple data tasks, while other DPRs may comprise only a single data task. Also, a given DPR may in some cases correspond to a particular data task of a higher-level DPR that has been separated into multiple data tasks.

It should also be understood that separation of a given DPR into multiple data tasks can occur prior to or subsequent to receipt of indications from distributed data processing clusters within the distribution category regarding their respective abilities to fulfill the DPR or portions thereof. Accordingly, in some embodiments the DPR itself is provided to data cells of the clusters in the distribution category and in other embodiments particular data tasks of the DPR are provided to data cells of particular ones of the clusters in the distribution category.

The diagram of FIG. 2 also illustrates a number of processing operations performed within the system 200. The operations are labeled 1 through 7 in the figure, and more specifically include the following:

1. User submits analytic DPR to WWH-DA master detailing requirements.
2. WWH-DA master informs the data cells of all clusters in DPR distribution category.
3. The data cells respond with the ability to fulfill the DPR.
4. The WWH-DA master breaks down the DPR into to data tasks and distributes depending on the responses from the data cells.
5. Data tasks are processed by the clusters and returned to the WWH-DA master.
6. WWH-DA master validates the result sets against one or more validators.
7. WWH-DA aggregates all result sets and transmits back to the user.

The FIG. 2 embodiment illustrates a basic data-driven analytics workload distribution process carried out in the system 200.

The illustrative embodiments of FIGS. 3, 4, 5 and 6 show examples of additional or alternative data-driven analytics workload distribution processes that involve recursive coordination, geographic restriction, cost-based scheduling and best efforts coordination, respectively. Each of these embodiments includes one or more workload distribution nodes configured to communicate with multiple distributed data processing clusters. The workload distribution nodes implement respective WWH-DA masters each of which includes a data cell, a coordinator and multiple validators.

In one or more of these embodiments, the DPR is presented to the data cells of the clusters within the distribution category prior to the separation of the DPR into data tasks. Other embodiments perform the separation and then provide particular data tasks to certain clusters within the distribution category. Various hybrid arrangements of these two illustrative variants are also possible.

Figure 3:
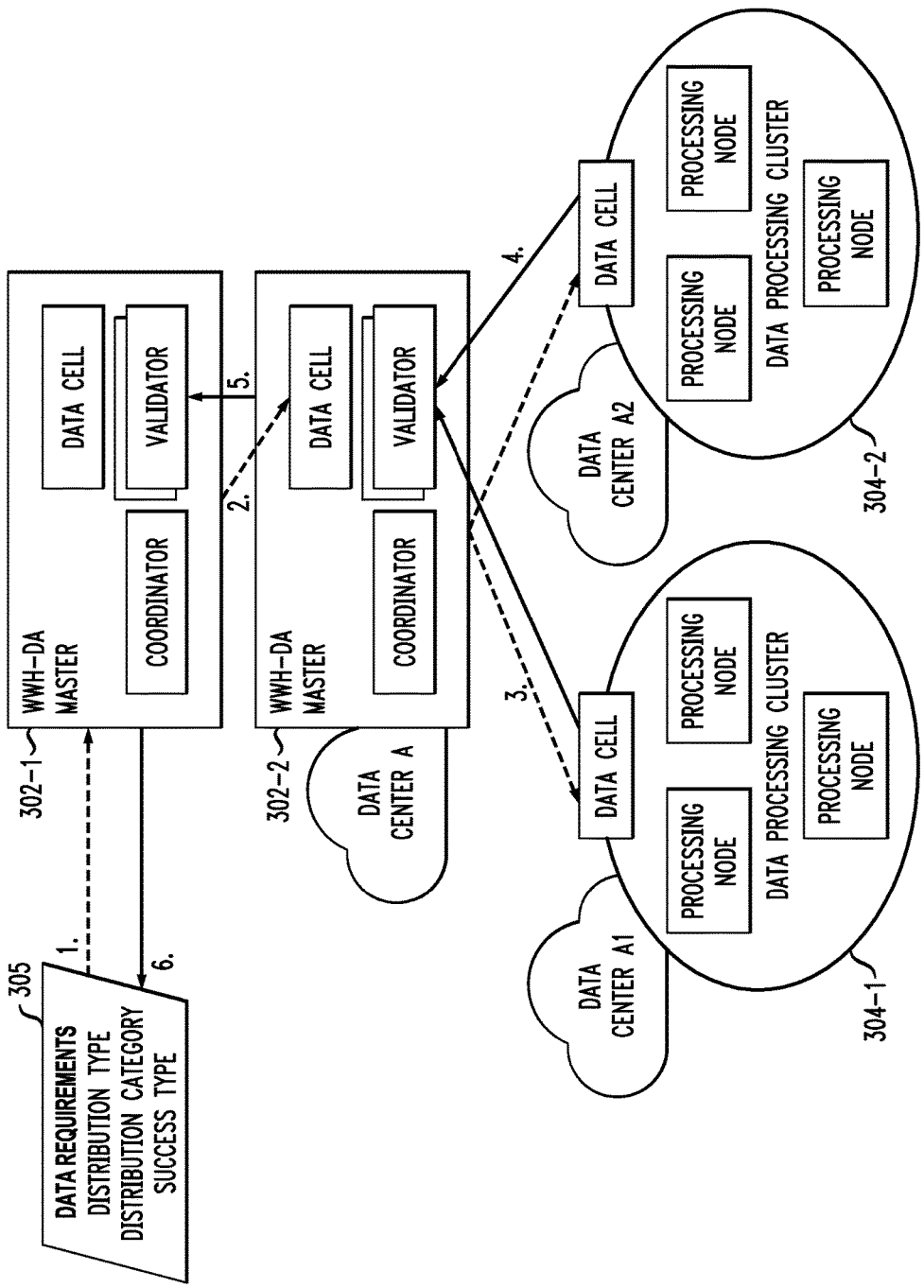

FIG. 3 shows an information processing system 300 comprising first and second workload distribution nodes 302-1 and 302-2. The first workload distribution node 302-1 communicates with the second workload distribution node 302-2, and the second workload distribution node 302-2 communicates with distributed data processing clusters 304-1 and 304-2 as shown. The workload distribution nodes 302 implement respective WWH-DA masters of the type previously described.

The distributed data processing clusters 304-1 and 304-2 in this embodiment are associated with respective distinct data centers denoted Data Center A1 and Data Center A2. The second workload distribution node 302-2 is associated with another data center denoted Data Center A that may illustratively encompass a particular data zone comprising both Data Center A1 and Data Center A2.

The diagram of FIG. 3 also illustrates a number of processing operations performed within the system 300 in handling a DPR 305. The operations are labeled 1 through 6 in the figure, and more specifically include the following:

1. User submits analytic DPR to WWH-DA master detailing requirements.
2. WWH-DA master informs the data cells of all clusters in DPR distribution category.
3. In this case, the data cell acts as a master for subsidiary clusters, informing downline clusters of the DPR.
4. The process continues recursively, distributing the data tasks and validating and aggregating the responses.
5. Each level in the recursion validates and aggregates the responses for its substituent clusters.
6. The final response is returned to the user.

These particular process operations, and other operations described in conjunction with other embodiments herein, are illustrative examples only and should not be construed as limiting in any way.

Figure 4:
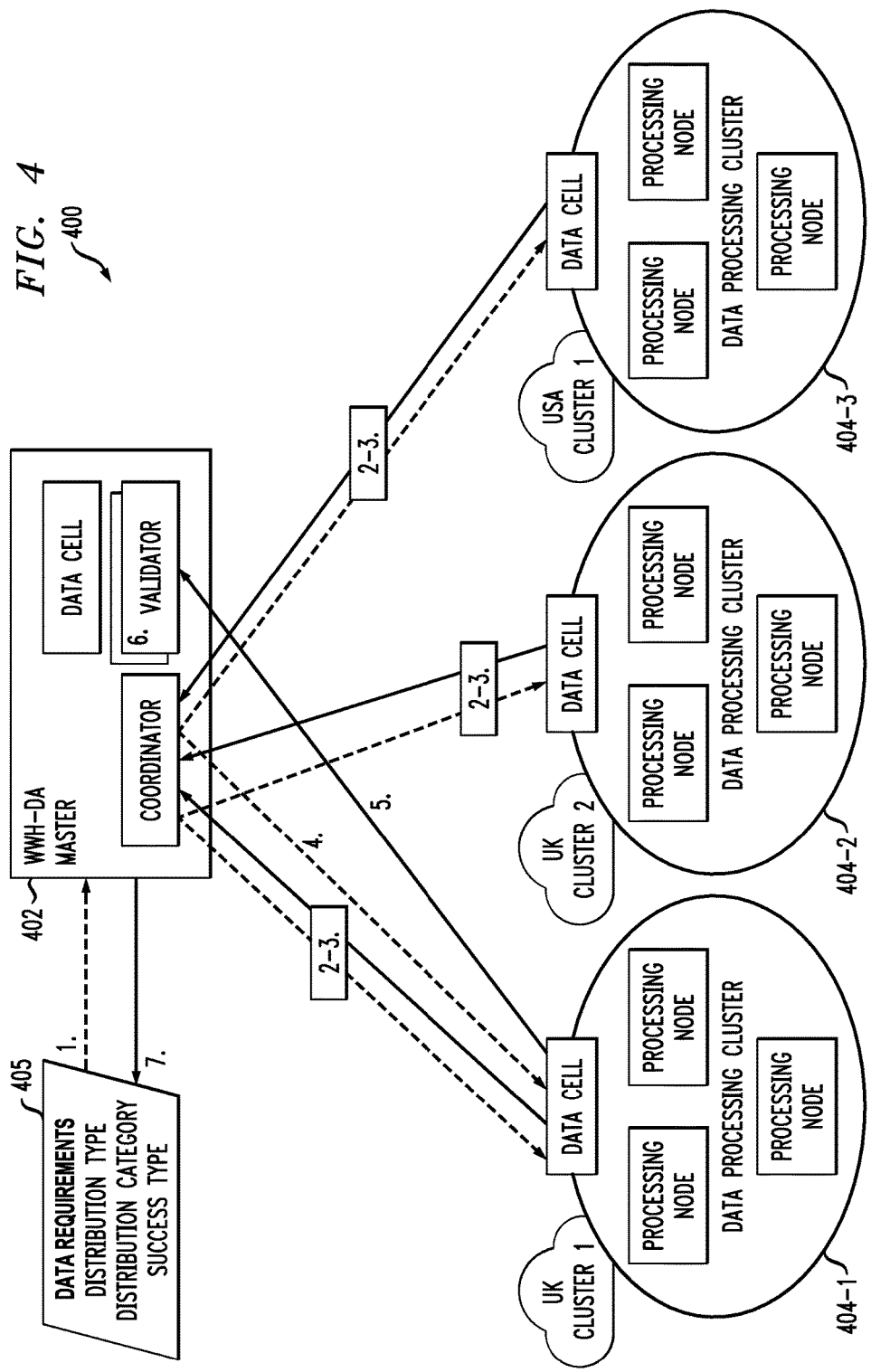

Referring now to FIG. 4, an information processing system 400 comprises a workload distribution node 402. The workload distribution node 402 communicates with distributed data processing clusters 404-1, 404-2 and 404-3 as shown. The workload distribution node 402 implements a WWH-DA master of the type previously described.

The distributed data processing clusters 404-1, 404-2 and 404-3 in this embodiment are associated with respective distinct geographic clusters denoted UK Cluster 1, UK Cluster 2 and USA Cluster 1.

The diagram of FIG. 4 also illustrates a number of processing operations performed within the system 400 in handling a DPR 405. The operations are labeled 1 through 7 in the figure, and more specifically include the following:
1. User submits analytic DPR to WWH-DA master detailing requirements. In this case, requests data from first UK cluster to respond.
2. WWH-DA master informs the data cells of all clusters in DPR distribution category.
3. The data cells respond with the ability to fulfill the DPR. In this case, only UK clusters can fulfill, and since first response was chosen, only UK Cluster 1 is chosen to complete the data tasks.
4. The WWH-DA master breaks down the DPR to data tasks and distributes to UK Cluster 1.
5. Data tasks are processed by the cluster and returned to the WWH-DA master.
6. WWH-DA master validates the result sets against one or more validators.
7. WWH-DA aggregates all result sets and transmits back to the user.

Figure 5:
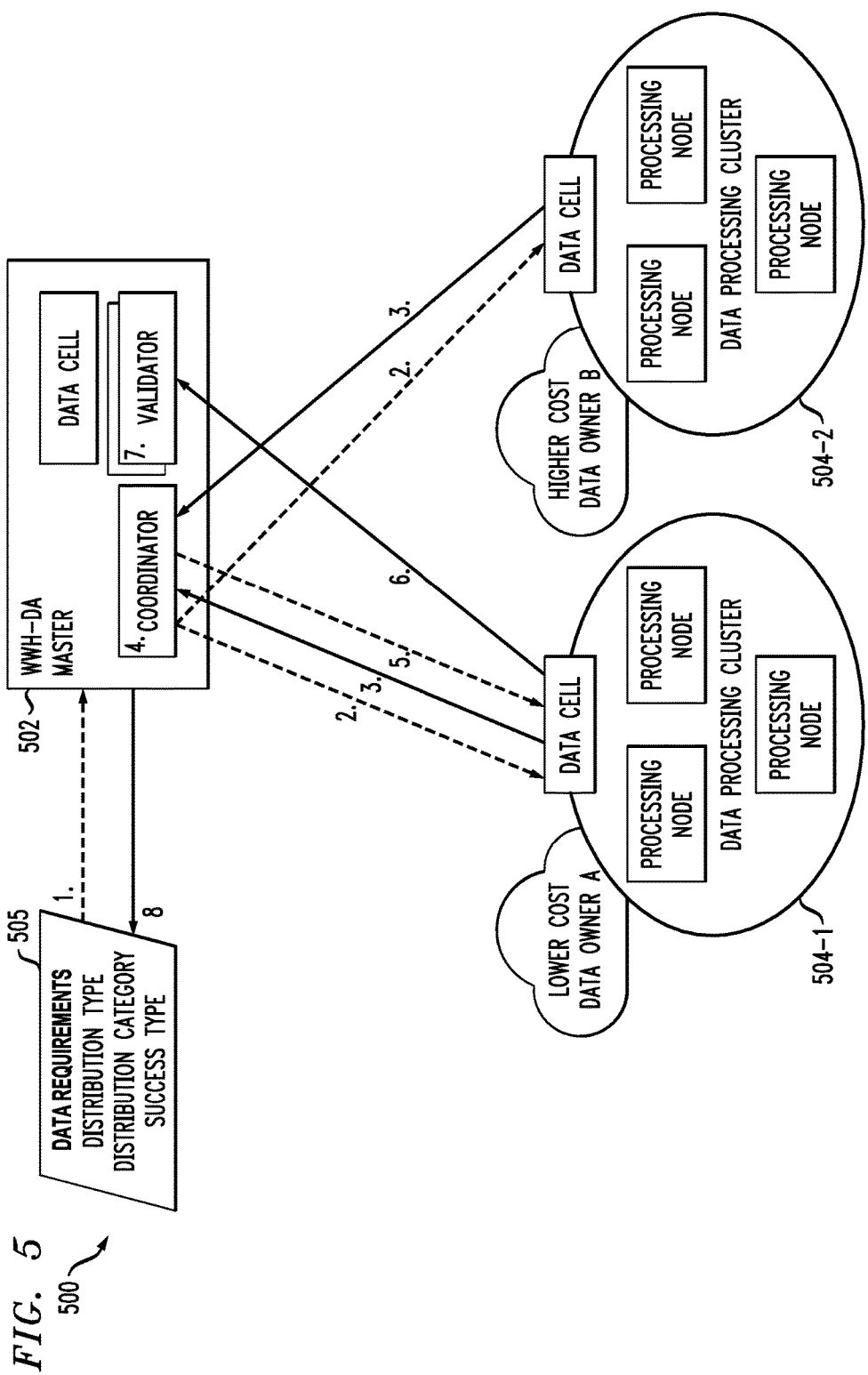

FIG. 5 shows an information processing system 500 comprising a workload distribution node 502. The workload distribution node 502 communicates with distributed data processing clusters 504-1 and 504-2 as shown. The workload distribution node 502 implements a WWH-DA master of the type previously described.

The distributed data processing clusters 504-1 and 504-2 in this embodiment are associated with respective distinct data owners including a lower cost data owner denoted Data Owner A and a higher cost data owner denoted Data Owner B.

The diagram of FIG. 5 also illustrates a number of processing operations performed within the system 500 in handling a DPR 505. The operations are labeled 1 through 8 in the figure, and more specifically include the following:
1. User submits analytic DPR to WWH-DA master detailing requirements.
2. WWH-DA master informs the data cells of all clusters in DPR distribution category.
3. The data cells respond with the ability to fulfill the DPR and the cost.
4. WWH-DA master automatically chooses lowest cost respondent with relevant data.
5. WWH-DA master breaks down the DPR to data tasks and distributes depending on the responses from the data cells.
6. Data tasks are processed by the cluster and returned to the WWH-DA master.
7. WWH-DA master validates the result sets against one or more validators.
8. WWH-DA aggregates all result sets and transmits back to the user.

Figure 6:
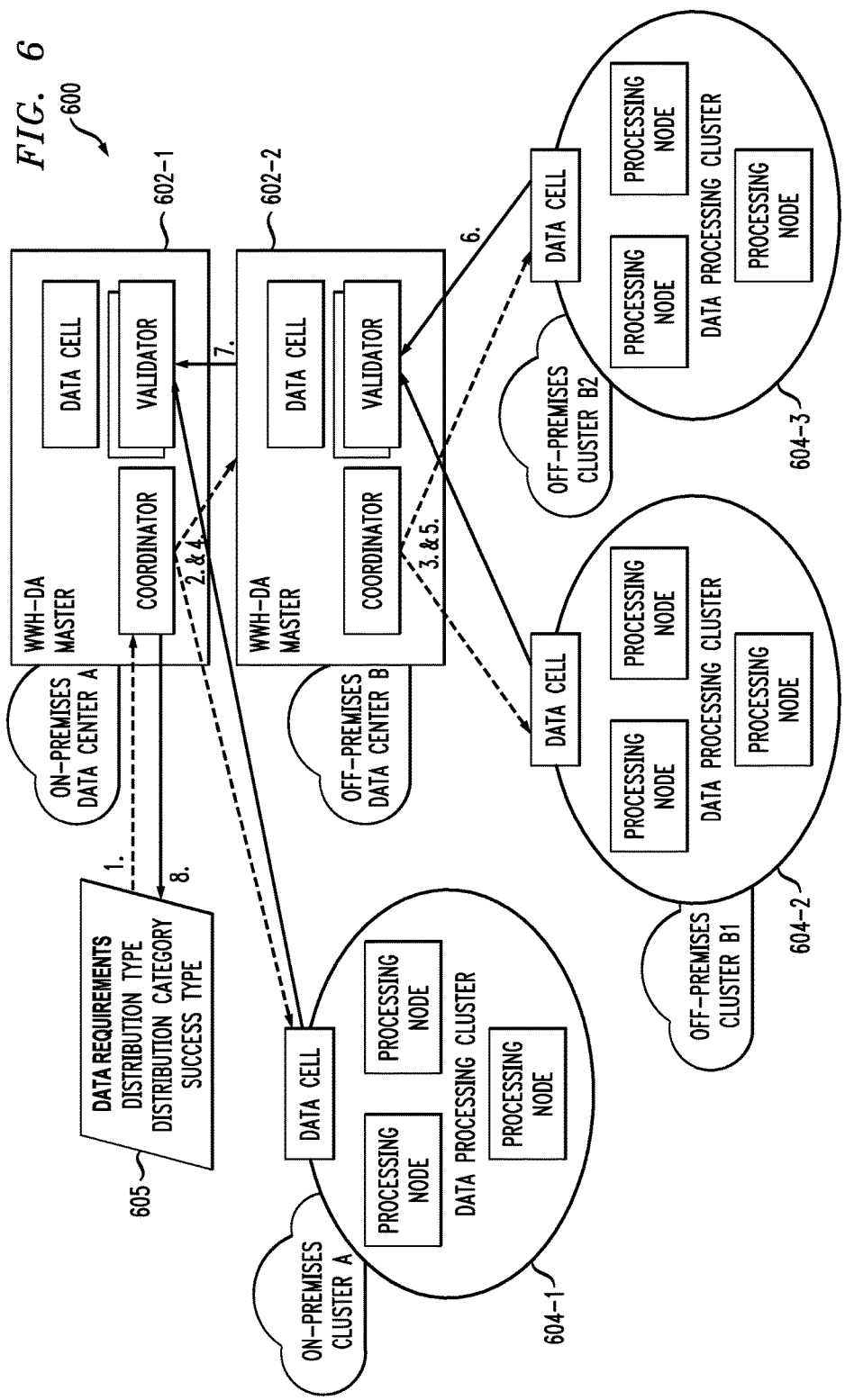

Referring now to FIG. 6, an information processing system 600 comprises first and second workload distribution nodes 602-1 and 602-2 associated with respective on-premises and off-premises data centers denoted On-Premises Data Center A and Off-Premises Data Center B. The first workload distribution node 602-1 communicates with a first distributed data processing cluster 604-1 and with the second workload distribution node 602-2. The second workload distribution node 602-2 communicates with additional distributed data processing clusters 604-2 and 604-3 as shown. The workload distribution nodes 602 implement respective WWH-DA masters of the type previously described.

The distributed data processing cluster 604-1 in this embodiment is an on-premises cluster denoted On-Premises Cluster A. The distributed data processing clusters 604-2 and 604-3 in this embodiment are off-premises clusters denoted Off-Premises Cluster B1 and Off-Premises Cluster B2. On-Premises Data Center A illustratively encompasses a data zone comprising On-Premises Cluster A. Off-Premises Data Center B illustratively encompasses a data zone comprising Off-Premises Cluster B1 and Off-Premises Cluster B2.

The diagram of FIG. 6 also illustrates a number of processing operations performed within the system 600 in handling a DPR 605. The operations are labeled 1 through 8 in the figure, and more specifically include the following:
1. User submits analytic DPR to WWH-DA master detailing requirements.
2. WWH-DA master informs the data cells of all clusters in DPR distribution category.
3. The off-premises data cell acts as a master for the off-premises clusters, informing downline clusters of the DPR.
4. The on-premises master directly sends the data tasks to on-premises Cluster A as well as the off-premises WWH-DA Master.
5. The off-premises master sends the data tasks to the off-premises clusters.
6. The off-premises master validates and aggregates the results from the off-premises clusters.
7. The on-premises master validates and aggregates the results from both the on-premises and off-premises clusters.
8. The results are returned to the user.

Again, the particular processing operations and other system functionality described in conjunction with the diagrams of FIGS. 2 through 6 are presented by way of illustrative example only, and should not be construed as limiting the scope of the invention in any way. Alternative embodiments can use other types of processing operations for implementing multi-cluster distributed data processing functionality. For example, the ordering of the process steps may be varied in other embodiments, or certain steps may be performed concurrently with one another rather than serially. More particularly, as indicated previously, the separation of a given DPR into processing tasks may be performed earlier in each process, with each data task only being provided to the appropriate distributed data processing clusters for consideration. Also, one or more of the process steps may be repeated periodically for different types of analytics functionality, or multiple instances of the process can be performed in parallel with one another on different sets of workload distribution nodes and distributed data processing clusters within a given information processing system.

It is to be appreciated that functionality such as that described in conjunction with the diagrams of FIGS. 2 through 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments implementing data-driven automation mechanisms for analytics workload distribution will now be described with reference to FIGS. 7 and 8.

Figure 7:
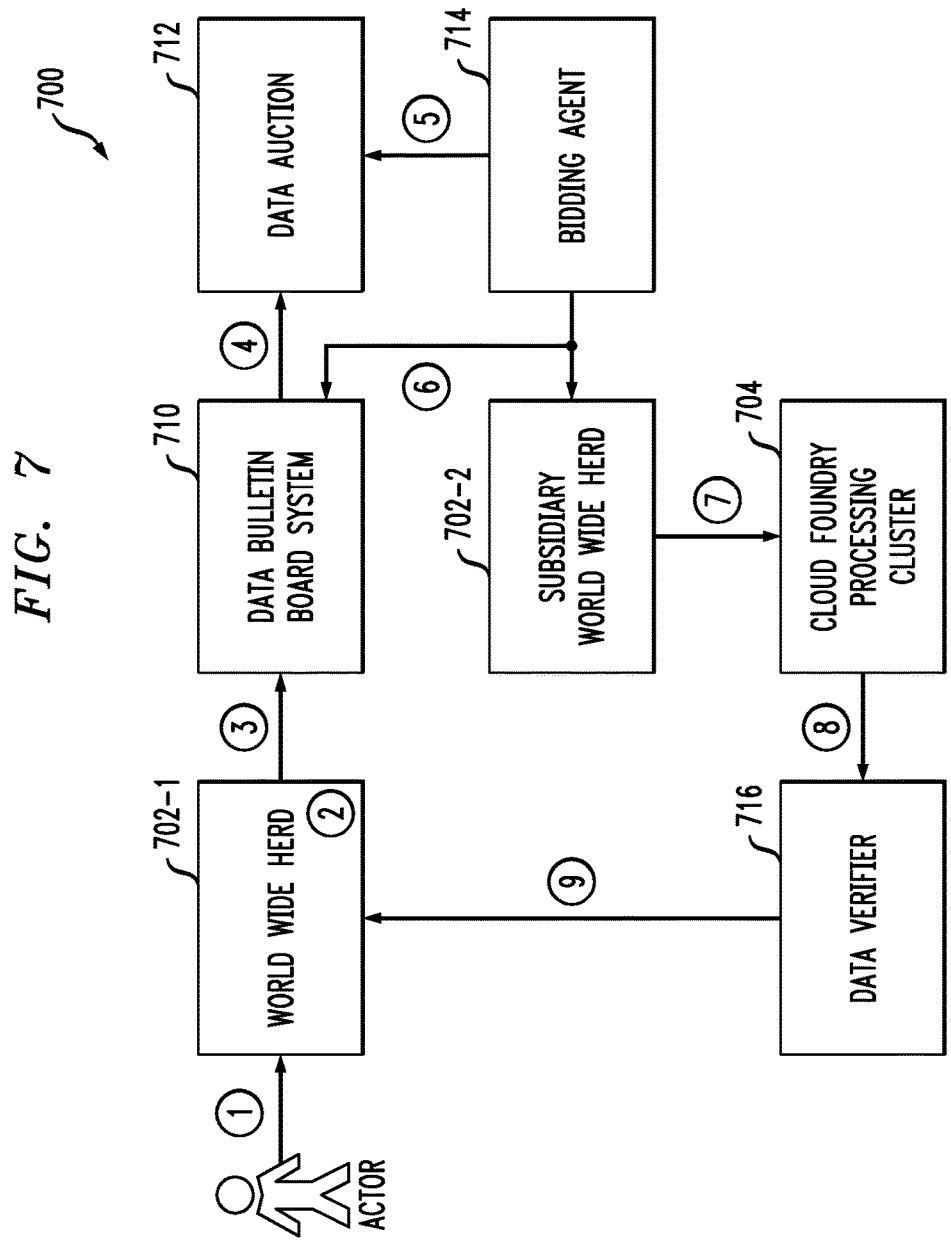
FIG. 7 shows an example process for a WWH data auction in an illustrative embodiment.

Referring now to FIG. 7, an information processing system 700 comprises first and second workload distribution nodes 702-1 and 702-2, also referred to in this embodiment as a WWH node and a subsidiary WWH node, respectively. The system 700 further comprises a distributed data processing cluster 704 which is more particularly implemented in this embodiment as a Cloud Foundry processing cluster. Cloud Foundry is an example of a type of open source processing platform providing Platform-as-a-Service (PaaS) functionality to users. Other types of processing platforms can be used.

The system 700 further comprises a data bulletin board system 710, a data auction component 712, a bidding agent 714 and a data verifier 716.

Processing operations performed in the system 100 are illustratively shown by circled numbers from 1 through 7. These operations are more particularly described as follows:

1. A user (e.g., "actor") submits an analytics job to workload distribution node 702-1. The analytics job is one possible example of at least a portion of what is more generally referred to herein as an "analytics workload." Other types of workloads each comprising one or more processing jobs can be used in other embodiments.

It is assumed that the workload distribution nodes 702 each implement a WWH-DA master of the type previously described. The submitted analytics job specifies the data types required for inputs, as well as the data types of the result set.

The data may be returned in various formats, such as text or binary. The data type is determined by the validation rules specified by the data owner. The data type is retrieved by a separate API call that returns the name of the data type as well as a descriptor of the validation rules. There may be standard data types for both simple data such as integer, floating point, text, or binary data as well as complex data such as genomic or geospatial data. Complex data types may require multiple validators, in which case the API call returns a full ordered list of validators. Data types may be derived from other data types, such as an anonymous genomic data type being extended from the standardized genomic data type.

As indicated previously, the WWH-DA masters of the workload distribution nodes 702 each implement a data cell. Such a data cell in the present embodiment is configured to allocate portions of the analytics job between participants in the data auction. It is illustratively configured to operate in a manner similar to a cell process implemented in virtual machines scheduled by a Cloud Foundry Diego scheduler. The Diego scheduler allows the virtual machines to participate in an auction for compute jobs via their respective cell processes. However, a conventional Diego implementation does not have any concept of data placement in its auction algorithm. The WWH-DA masters in the present embodiment comprise data cells that communicate with similar data cells in the distributed data processing clusters in order to provide data auction functionality in association with processing of a DPR.

2. The WWH-DA master of the first workload distribution node 702-1 receives the analytics job in the form of a DPR of the type previously described.

3. The WWH-DA master breaks down the DPR into the individual data tasks, one for each distribution type, and submits these to the data bulletin board system 710. The data bulletin board system 710 may be implemented as a Diego Bulletin Board System (BBS) which is extended to handle data tasks of a DPR. The data bulletin board system 710 may be implemented at least in part as a component of the WWH-DA master.

4. The data auction component 712 conducts data auctions for respective ones of the data tasks. This is a centralized function and although shown as a separate element in the figure is illustratively part of or otherwise associated with the WWH-DA master of the workload distribution node 702-1. Local and remote Cloud Foundry processing clusters are able to participate. Individual clusters use respective instances of bidding agent 714, which has knowledge of the data sets owned by its Cloud Foundry cluster as well as the permissions required for accessing the data and obtaining the results. This information is utilized to allow the corresponding cluster to bid in the WWH data auction.

5. If an instance of bidding agent 714 associated with a particular Cloud Foundry cluster wins the WWH data auction, the corresponding data task is transmitted to the cluster. More than one agent may win as determined by the success type field of the DPR.

6. The winning cluster may represent a second internal set of Cloud Foundry clusters. In this case, it may create a secondary WWH data auction to divide the data task if necessary and distribute the data task(s) to the subsidiary clusters. For example, such functionality is illustratively implemented by the WWH-DA master of workload distribution node 702-2. This process is repeated until there are no additional subsidiary clusters.

7. If the winning Cloud Foundry processing cluster does not contain subsidiary clusters, the data task is provided to a WWH local controller of that winning cluster. The WWH local controller specifies the application components required to run the processing application and illustratively submits its application-staging request to a standard Cloud Foundry Cloud Controller Bridge (CC-Bridge). The CC-Bridge then follows a standard Cloud Foundry Diego flow for running the application.

8. The Cloud Foundry processing cluster 704 processes the data set and passes the results to the data verifier 716. Again, although shown as a separate element in the figure, the data verifier is illustratively part of or otherwise associated with the WWH-DA master of the workload distribution node 702-1. The data verifier 716 checks to make sure the processed data matches the type of the request and may handle other additional compliance checks. The data verifier 716 in some embodiments is part of a layered security system for protecting data transactions within the system 700.

9. The WWH-DA master of the workload distribution node 702-1 handles the completion and aggregation of the constituent data tasks to complete the application processing. In this embodiment, the WWH-DA master is not responsible for verifying the success or failure of the processing itself.

As in other processes described herein, the process described above in conjunction with FIG. 7 is presented by way of example only and the particular processing operations and the particular arrangement of system components used to perform those operations may be varied in other embodiments.

A given data transaction in the FIG. 7 embodiment can be secured using a variety of different techniques. Cloud Foundry typically uses a role-based access control (RBAC) system to grant users permissions appropriate to their role. Such an arrangement can be extended in the FIG. 7 embodiment to create a new set of access control operations for submitting DPRs or data auction bids within the system 700. By default, such operations may be available to a Cloud Foundry Space Developer that owns the initiating application and data set processing application respectively. The Cloud Foundry Space Developer generally refers to a permission level in Cloud Foundry that controls a full application including data, but not the underlying processing resources or security settings.

The system 700 of the FIG. 7 embodiment can also be configured such that all actions are logged into a central log system. For example, actions associated with the Cloud Foundry processing cluster 704 can be logged at least in part utilizing a Cloud Foundry Log System, which is a central log system that is used for security, audit, compliance and debugging within a Cloud Foundry cluster. Additionally, the actions specific to a given analytics job could be separately combined into a log specific to the WWH data auction so that that the initiating organization can audit the log for debugging or compliance.

In addition, a type verifier agent can be implemented as part of or in conjunction with each of the WWH-DA masters of the workload distribution nodes 702 so as to ensure that the data returned by the distributed data processing clusters has the appropriate type parameters specified in the DPR in order to aid in compliance.

The FIG. 7 embodiment and other illustrative embodiments herein enable the auctioning of data processing without having to aggregate or give over control of the root data. For example, a requester may specify all the data required to complete an aggregate analytics job without any single entity owning or having access to all the constituent data. The requester may specify that the analysis will only run once it has commitments for all the required data to save it the cost of incomplete data runs.

These and other embodiments also provide a high degree of flexibility in WWH platform configuration. For example, in the FIG. 7 embodiment, the Cloud Foundry platform can be leveraged to bring additional distributed data processing clusters online in order to handle analytic requests as required.

It should be noted that a given information processing system with WWH data auction functionality as disclosed herein can be configured to run on top of different cloud architectures, handling the distribution of data tasks without requiring the corresponding data to be combined in a single location or cluster. Accordingly, data can be processed in place even if parts of the data are stored across a multi-cloud environment.

Figure 8:
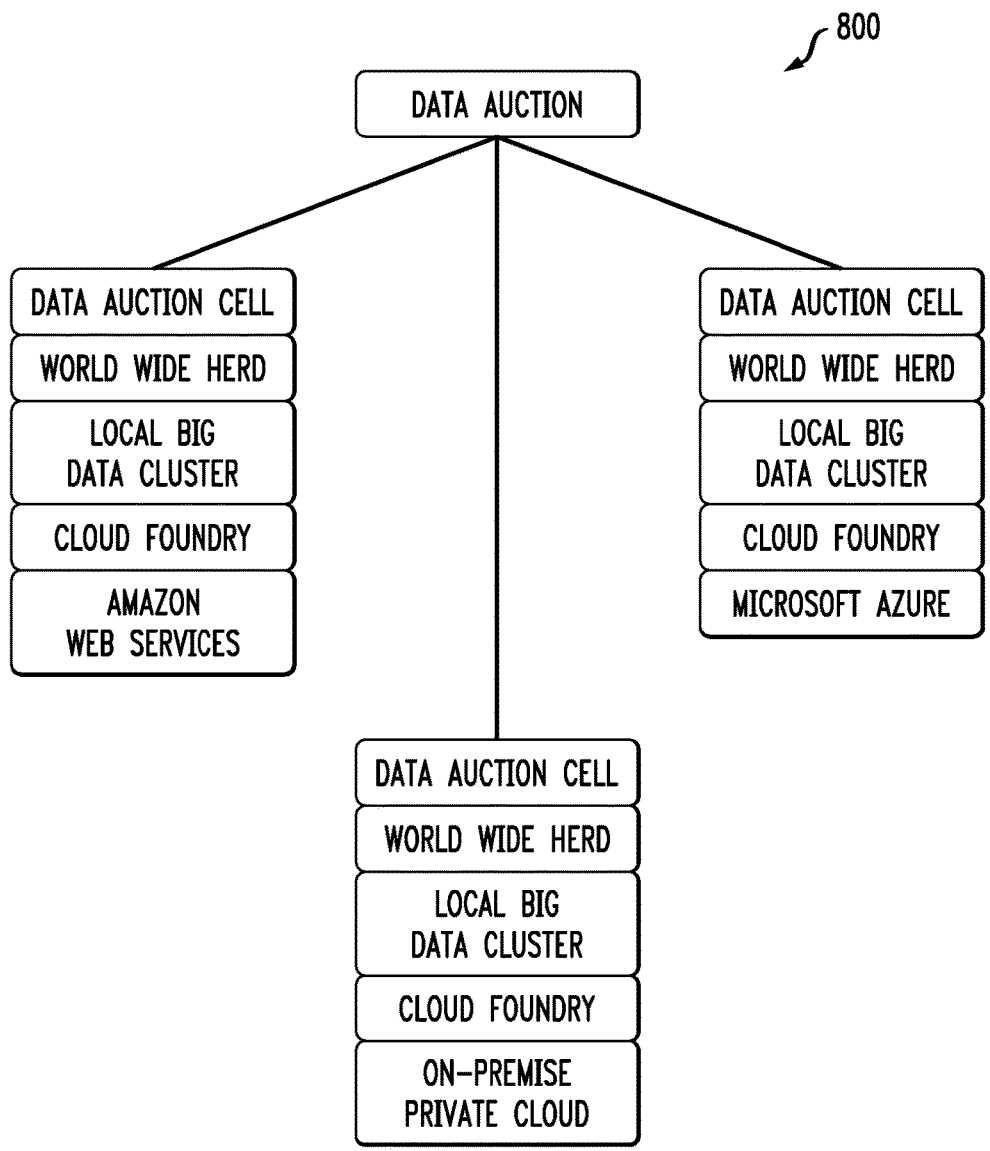
FIG. 8 shows an example of a multi-cloud distribution arrangement in an illustrative embodiment.

FIG. 8 shows an example of a multi-cloud distribution arrangement of this type. In this embodiment, a WWH data auction is implemented in an information processing system 800 using distinct data auction cells associated with respective WWH nodes in communication with respective clouds of different types, including an Amazon Web Services cloud, a Microsoft Azure cloud and an on-premises cloud that illustratively comprises a virtual machine based cloud. Each of the distinct clouds in this embodiment is illustratively associated with a corresponding Cloud Foundry platform and local Big Data cluster. The user does not need to know which of these distinct clouds has the necessary data as only the cloud containing the appropriate data can fulfill the auction requirements. This enables a hybrid cloud model as the system 800 chooses the appropriate cloud for a given data task without requiring explicit user intervention in cloud allocation.

A number of additional examples of illustrative embodiments implementing data-driven analytics workload distribution functionality will now be described.

In one example, interactive natural language interfaces or "chat bots" are developed using combinations of multiple disparate data sets. Such data sets illustratively include, for example, restaurant reviews, metro travel schedules, and map data. These data sets may be owned by different entities, including corporate or governmental, that do not wish to share the overall data sets. A WWH platform comprising workload distribution nodes implementing respective WWH-DA masters of the type described above allows a request for data processing to be sent to a single central data broker. The entities owning the required data would bid on their ability and willingness to process the analysis on their data set, enabling the creation of a chat bot development ecosystem.

In another example, a peer-to-peer data broker is provided. A WWH platform comprising workload distribution nodes implementing respective WWH-DA masters of the type described above allows entities to set up a data broker without the broker holding license to the underlying data. The broker would act as an auction house, charging fees for listing or as a percentage of the transaction. The requestor uses the platform to specify the required data result, and the bidding process matches the request to data owners as applicable for execution. Since the data broker does not resell the data, this may reduce or eliminate the tax and regulatory implications of the data transaction. For example, a U.S. company may broker a data transaction between two European entities without the data passing through U.S. servers.

As yet another example, an illustrative embodiment can be configured to provide geographic genomic processing. Governments often support genomic data. For example, assume there are two genomic research data sets available to a WWH platform, one in France and one in the UK, in respective data processing clusters. If researchers wanted to pull data for women in both countries, they could create an auction with a universal distribution type and specifying the request for genomic data. The data cells of the two data processing clusters in the UK and France would join the auction, and both would win the auction. The WWH-DA master would then assign different portions of the request to both clusters. If the researchers only wanted data from the UK, they could add a geographic distribution type. In this case, both the UK and France clusters would participate in the auction, but only the UK cluster would win. The WWH-DA master would then assign the request only to the UK cluster for processing.

The foregoing examples are illustrative only and should not be viewed as restrictive in any way. The particular features described in conjunction with these examples therefore need not be present in other embodiments.

It is apparent from the above that illustrative embodiments can be configured to perform Big Data analytics processing and other types of workload processing using a multitude of disparate data sources, many of which cannot be consolidated for a variety of reasons, including concerns with regards to data residency, data sovereignty, data ownership, data anonymization, data governance, or the raw size of the data which puts severe constraints on the network bandwidth and speed requirements for data transmission.

For example, with regard to geographic limits on data movement, some data types such as genetic records cannot be shared across geographic boarders due to laws, regulations or even tax consequences. Illustrative embodiments can be configured to run the analysis locally but to share the results, thereby more readily complying with these regulations while also allowing for the processing of the data to be developed, coordinated, and handled centrally as a single clustered system.

As another example, with regard to data anonymization, data may include sensitive personal data for which potential disclosure should be limited wherever possible. Thus, it is highly undesirable to collect all the data in a single location that is open to misuse or security breach. Illustrative embodiments can be configured to allow a first level of analysis to occur locally within a given distributed data processing cluster, with only anonymized and filtered data centralized for follow-on analysis.

In addition, with regard to data ownership, in many cases companies, governments, and other public and private institutions may not wish to share raw data for a variety of reasons, including disclosure risk, competitive advantage, or necessary permissions for sharing the data. Illustrative embodiments allow such data to be processed "in place" within a distributed data processing cluster controlled by the data owner, thereby permitting limited and controlled access to the data for analytics purposes without undermining owner control over other possible uses of the data.

Some embodiments implement an auction-based data brokerage that enables private-party transactions on a case-by-case base while retaining a centralized and simplified system for running analytics workloads. Such arrangements advantageously prevent data owners from losing control of downstream uses of their data, while also limiting the tax and regulatory implications of the data transactions.

As an additional example, illustrative embodiments can accommodate arrangements in which data is distributed across different data centers or in different clouds, such as an Amazon Web Services cloud, a Microsoft Azure cloud and an on-premises private cloud, while avoiding concerns associated with data transfer.

Accordingly, the illustrative embodiments provide significant advantages in these and other cases in which it is not feasible to centralize the data for analytics processing.

Again, the use of particular frameworks as part of a WWH platform is by way of illustrative example only. Numerous alternative frameworks can be utilized as part of a given WWH platform, including in some embodiments any framework supported by YARN, as well as other frameworks in non-YARN embodiments.

The multi-cluster distributed data processing platforms of illustrative embodiments disclosed herein provide significant advantages relative to conventional arrangements.

As mentioned previously, illustrative embodiments move the computation instead of moving the data and create an abstraction to distributed Big Data in order to overcome the drawbacks of conventional systems, providing significant advantages in terms of both performance and privacy, and related advantages such as the facilitation of GRC, as outlined in detail elsewhere herein.

It is to be appreciated that the particular types of system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as WWH nodes 102 and distributed data processing clusters 104, or portions thereof, can be implemented as respective tenants of such a multi-tenant environment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of a given distributed data processing cluster or associated data processing node in a particular embodiment are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, multi-cluster distributed data processing platforms, application frameworks, processing nodes, local and remote data resources and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    receiving a data processing request in a first workload distribution node configured to communicate with a plurality of distributed data processing clusters over at least one network;
    identifying particular ones of the plurality of distributed data processing clusters that are suitable for handling at least a portion of the data processing request;
    separating the data processing request into a plurality of data tasks;
    providing each of the data tasks to one or more of the identified distributed data processing clusters;
    receiving for each of the data tasks an indication from one or more of the distributed data processing clusters of its ability to perform the data task;
    assigning the data tasks to one or more of the distributed data processing clusters responsive to the received indications;
    receiving results of performance of the data tasks from the one or more assigned distributed data processing clusters; and
    aggregating the results into a response that is returned to a source of the data processing request;
    wherein the source of the data processing request comprises another workload distribution node and further wherein the data processing request comprises a given data task of a higher-level data processing request separated into a plurality of data tasks by the other workload distribution node for handling by the first workload distribution node and one or more additional workload distribution nodes;
    wherein the first workload distribution node comprises an analytics workload distribution node and the given data task of the higher-level data processing request comprises a request to process at least a portion of an analytics workload using at least a subset of the plurality of distributed data processing clusters;
    wherein the data tasks are assigned and the corresponding results are aggregated in a manner that ensures satisfaction of one or more privacy policies of the one or more distributed data processing clusters;
    wherein the method is performed by at least one processing device comprising a processor coupled to a memory; and
    wherein said at least one processing device implements the first workload distribution node.

2. The method of claim 1 wherein the data processing request comprises a plurality of fields including two or more of a distribution type field, a distribution category field and a success type field, and wherein the distribution type field denotes a particular distribution type including one or more of universal distribution, geographic distribution and custom distribution, the distribution category field denotes a particular distribution category including a designated set of distributed data processing clusters of a particular distribution type, and the success type field denotes a particular success type including one or more of all distributed data processing clusters required, at least one cluster required, first cluster to bid, lowest cost cluster and best effort among multiple clusters.

3. The method of claim 1 wherein at least a subset of the plurality of distributed data processing clusters are associated with respective distinct data centers.

4. The method of claim 1 further comprising validating the results of performance of the data tasks from the assigned distributed data processing clusters prior to aggregating the results into the response that is returned to the source of the data processing request.

5. The method of claim 1 wherein the workload distribution node comprises at least a portion of a WWH node.

6. The method of claim 1 wherein each of the workload distribution nodes is associated with a different set of one or more distributed data processing clusters.

7. The method of claim 1 wherein the first workload distribution node provides at least a portion of the received data processing request to another workload distribution node as another data processing request.

8. The method of claim 1 wherein the first workload distribution node provides one or more of the data tasks to another workload distribution node for possible assignment to one or more additional distributed data processing clusters.

9. The method of claim 8 wherein the first workload distribution node is associated with an on-premises data center of an enterprise and the other workload distribution node is associated with one or more off-premises data centers of the enterprise.

10. The method of claim 1 wherein the data processing request includes an indication that only a subset of the distributed data processing clusters of a particular type can be assigned to perform its associated data tasks.

11. The method of claim 1 wherein the indications received by the first workload distribution node of the ability of the one or more distributed data processing clusters to perform the data tasks include respective estimates from one or more of the distributed data processing clusters of costs associated with performing the data tasks.

12. A computer program product comprising a non-transitory processor-readable storage medium having stored therein program code of one or more software programs, wherein the program code when executed by at least one processing device causes said at least one processing device to implement a first workload distribution node configured to communicate with a plurality of distributed data processing clusters over at least one network, the first workload distribution node being further configured:
    to receive a data processing request;
    to identify particular ones of the plurality of distributed data processing clusters that are suitable for handling at least a portion of the data processing request;
    to separate the data processing request into a plurality of data tasks;
    to provide each of the data tasks to one or more of the identified distributed data processing clusters;
    to receive for each of the data tasks an indication from one or more of the distributed data processing clusters of its ability to perform the data task;
    to assign the data tasks to one or more of the distributed data processing clusters responsive to the received indications;
    to receive results of performance of the data tasks from the one or more assigned distributed data processing clusters; and
    to aggregate the results into a response that is returned to a source of the data processing request;
    wherein the source of the data processing request comprises another workload distribution node and further wherein the data processing request comprises a given data task of a higher-level data processing request separated into a plurality of data tasks by the other workload distribution node for handling by the first workload distribution node and one or more additional workload distribution nodes; and
    wherein the first workload distribution node comprises an analytics workload distribution node and the given data task of the higher-level data processing request comprises a request to process at least a portion of an analytics workload using at least a subset of the plurality of distributed data processing clusters;
    wherein the data tasks are assigned and the corresponding results are aggregated in a manner that ensures satisfaction of one or more privacy policies of the one or more distributed data processing clusters.

13. The computer program product of claim 12 wherein the data tasks are assigned and the corresponding results are aggregated in a manner that further ensures satisfaction of one or more specified policies of the one or more distributed data processing clusters relating to at least one of security, governance, risk and compliance.

14. The computer program product of claim 12 wherein the data processing request comprises a plurality of fields including two or more of a distribution type field, a distribution category field and a success type field, and wherein the distribution type field denotes a particular distribution type including one or more of universal distribution, geographic distribution and custom distribution, the distribution category field denotes a particular distribution category including a designated set of distributed data processing clusters of a particular distribution type, and the success type field denotes a particular success type including one or more of all distributed data processing clusters required, at least one cluster required, first cluster to bid, lowest cost cluster and best effort among multiple clusters.

15. The computer program product of claim 12 wherein the first workload distribution node provides one or more of the data tasks to another workload distribution node for possible assignment to one or more additional distributed data processing clusters.

16. The computer program product of claim 15 wherein the first workload distribution node is associated with an on-premises data center of an enterprise and the other workload distribution node is associated with one or more off-premises data centers of the enterprise.

17. An apparatus comprising:
    at least one processing device having a processor coupled to a memory;
    wherein said at least one processing device implements a first workload distribution node configured to communicate with a plurality of distributed data processing clusters over at least one network;
    the workload distribution node being further configured:
    to receive a data processing request;
    to identify particular ones of the plurality of distributed data processing clusters that are suitable for handling at least a portion of the data processing request;
    to separate the data processing request into a plurality of data tasks;
    to provide each of the data tasks to one or more of the identified distributed data processing clusters;
    to receive for each of the data tasks an indication from one or more of the distributed data processing clusters of its ability to perform the data task;
    to assign the data tasks to one or more of the distributed data processing clusters responsive to the received indications;
    to receive results of performance of the data tasks from the one or more assigned distributed data processing clusters; and
    to aggregate the results into a response that is returned to a source of the data processing request;
    wherein the source of the data processing request comprises another workload distribution node and further wherein the data processing request comprises a given data task of a higher-level data processing request separated into a plurality of data tasks by the other workload distribution node for handling by the first workload distribution node and one or more additional workload distribution nodes;
    wherein the first workload distribution node comprises an analytics workload distribution node and the given data task of the higher-level data processing request comprises a request to process at least a portion of an analytics workload using at least a subset of the plurality of distributed data processing clusters; and wherein the data tasks are assigned and the corresponding results are aggregated in a manner that ensures satisfaction of one or more privacy policies of the one or more distributed data processing clusters.

18. The apparatus of claim 17 wherein the data tasks are assigned and the corresponding results are aggregated in a manner that further ensures satisfaction of one or more specified policies of the one or more distributed data processing clusters relating to at least one of security, governance, risk and compliance.

19. The apparatus of claim 17 wherein the data processing request comprises a plurality of fields including two or more of a distribution type field, a distribution category field and a success type field, and wherein the distribution type field denotes a particular distribution type including one or more of universal distribution, geographic distribution and custom distribution, the distribution category field denotes a particular distribution category including a designated set of distributed data processing clusters of a particular distribution type, and the success type field denotes a particular success type including one or more of all distributed data processing clusters required, at least one cluster required, first cluster to bid, lowest cost cluster and best effort among multiple clusters.

20. The apparatus of claim 17 wherein the first workload distribution node provides one or more of the data tasks to another workload distribution node for possible assignment to one or more additional distributed data processing clusters.

* * * * *